United States Patent [19]
Tahara et al.

[11] Patent Number: 5,153,639
[45] Date of Patent: Oct. 6, 1992

[54] FILM SUPPLYING APPARATUS

[75] Inventors: Toshiro Tahara; Seiji Makino; Tadashi Seto; Izumi Seto; Shigeru Yoshino; Matsuyuki Miwa, all of Kanagawa, Japan

[73] Assignee: Fuji Photo Film Co., Ltd., Kanagawa, Japan

[21] Appl. No.: 831,111

[22] Filed: Feb. 4, 1992

[30] Foreign Application Priority Data

Feb. 7, 1991 [JP] Japan .................. 3-16496
Feb. 20, 1991 [JP] Japan .................. 3-26204

[51] Int. Cl.⁵ .............................. G03B 27/62
[52] U.S. Cl. .......................... 355/75; 355/50; 355/76
[58] Field of Search ............. 355/75, 76, 50, 123

[56] References Cited

U.S. PATENT DOCUMENTS 4,097,292 3/1992 Hicks ........................ 355/75
4,996,558 2/1991 Tokuda et al. ............. 355/50

Primary Examiner—Richard A. Wintercorn
Attorney, Agent, or Firm—Sughrue, Mion, Zinn, Macpeak & Seas

[57] ABSTRACT

A film supplying apparatus includes a holding member for holding the vicinity of leading end portions of strips of negative film placed therein in a superposed state with a longitudinal direction of the negative film set in a curved configuration, and a pressing device for pressing an innermost ones, as viewed in a curved state, of the strips of negative film against a feed roller via the holding member. Accordingly, as the feed roller is rotated in the negative film feeding direction, the strips of film starting with the innermost one, as viewed in the curved state, of the strips of negative film are consecutively fed to a printer. In this case, since a force acting in a direction in which the curved shape of the film is reduced is applied to the negative film being fed, no large friction occurs with respect to the remaining film.

24 Claims, 22 Drawing Sheets

FILM SUPPLYING APPARATUS

BACKGROUND OF THE INVENTION

1. Field of the Invention

The present invention relates to a film supplying apparatus, and more particularly to a film supplying apparatus suitable for consecutively supplying a plurality of strips of negative film to a printer.

2. Description of the Related Art

When the operation of printing onto photographic paper or the like by using a plurality of strips of developed negative film or negatives is conducted, the negatives are set on a negative carrier one at a time, and a print operation key is then operated to cause printing light from a light source to be transmitted through the negative, thereby imagewise exposing the photographic paper or the like. Accordingly, when a plurality of strips of negative film are to be consecutively printed, the operator is required to set the negative and operate the print operation key on each such occasion.

In addition, when negatives are printed continuously in large volumes, there are cases where the negatives are connected in series by means of adhesive tape or the like and are taken up onto a reel, and this reel is loaded on a printer so as to print all the negatives automatically. However, after the printing, it is necessary to cut the connected film into separate pieces and to collate them with the prints, and damage can be caused to the negatives during these operations.

SUMMARY OF THE INVENTION

Accordingly, an object of the present invention is to provide a film supplying apparatus which makes it possible to set a plurality of strips of film at one time and in which, after the setting of the film, the plurality of strips of film are consecutively supplied to a printer.

To this end, in accordance with one aspect of the invention, there is provided a film supplying apparatus for supplying film to a printer, comprising: a holding member for holding at least a vicinity of leading end portions of a plurality of strips of film placed therein in a superposed state with a longitudinal direction of the plurality of strips of film set in a curved configuration; and feeding means for consecutively feeding the plurality of strips of film toward the printer as a tension acting in the longitudinal direction is applied to the leading end portion of an innermost one, as viewed in the curved state, of the plurality of strips of film.

With the apparatus of the invention arranged as described above, a plurality of strips of negative film are set in the film supplying apparatus in a state in which they are superposed one on top of another with the longitudinal direction thereof set in a curved state. These strips of film are in a superposed state as leading ends thereof are held by the holding member. This holding member is preferably arranged in such a manner as to hold transverse opposite edge portions of the negative film for preventing the images on the negative film from being damaged, and to hold the film in such a manner that the film can be moved in the longitudinal direction. These strips of film are consecutively fed to the printer starting with an innermost one, as viewed in a curved state, of the strips of film as a longitudinally pulling force is applied to a leading end portion of that innermost one of the strips of film.

Accordingly, the innermost one, as viewed in the curved state, of the strips of film is fed toward the printer, and as the film strip fed out receives a tensile force from the printer, its curved configuration is further reduced. For this reason, a force, which acts in such a manner as to cause the innermost one of the film strips to move away from the second innermost one of the film strips, is produced. Hence, even when the film strips are set in a laminated state and are fed out as the film moves longitudinally relative to the remaining film, it is possible to prevent damage from being caused to the image surfaces through a friction occurring between the moving film and the film adjacent thereto.

According to another aspect of the invention, there is provided a film supplying apparatus for supplying film to a printer, comprising: a holding member for holding at least a vicinity of leading end portions of a plurality of strips of film placed therein in a superposed state with a longitudinal direction of the plurality of strips of film set in a curved configuration; feed roller means for feeding the film toward the printer by applying a longitudinally driving force to the film; and pressing means for causing the holding member to approach the feed roller means and for pressing the leading end portion of an innermost one, as viewed in a curved state, of the plurality of strips of film against the feed roller means.

The pressing means may be arranged to rotate the film about an axis substantially parallel with the longitudinal direction of the film and to press the film against the feed roller means.

In addition, the pressing means may be provided with urging means for urging the holding member toward the feed roller means.

In accordance with still another aspect of the invention, there is provided a film supplying apparatus for supplying film to a printer, comprising: a holding portion for holding a plurality of strips of film in a superposed state; a film feeding portion for consecutively feeding in a longitudinal direction of the film the plurality of strips of film held by the holding portion so as to feed the film toward the printer; detecting means for detecting the film located in a film transport passage between the holding portion and the printer; determining means for determining on the basis of a detected signal whether or not two or more of the strips of film have been supplied in an overlapping state; and prohibiting means for prohibiting printing by the printer if a determination is made that two or more of the strips of film have been supplied in an overlapping state.

In accordance with this aspect of the invention, the film supplying apparatus arranged as described above is provided with the film feeding portion for consecutively feeding in the longitudinal direction of the film the plurality of strips of film from the holding portion for holding the plurality of strips of film in a superposed state, so as to feed the film toward the printer. In addition, this film supplying apparatus is further provided with the detecting means which detects the film located in a film transport passage between the holding portion and the printer. On the basis of the detected signal, the determining means determines whether or not two or more of the strips of film have been supplied in an overlapping state. Then, in a case where a determination is made that two or more of the strips of film have been supplied in an overlapping state, the prohibiting means stops the transport of the film, thereby preventing the printer from printing. Thus, when two or more film strips are fed in an overlapping state, the printing of the film is not performed, so that the printing operation is carried out properly without the printing operation being effected by two or more superposed film strips.

The detecting means may detect the length of a perforation of the film in a transport direction thereof, and the determining means may determine whether or not two or more of the strips of film have been supplied in an overlapping state, by determining whether or not the length of the perforation in the transport direction is less than a reference value.

Further, the detecting means may detect an amount of light transmitted through an area between adjacent ones of frame images recorded on the film, and the determining means may determine whether or not two or more of the strips of film have been supplied in an overlapping state, by determining whether or not the amount of light detected is less than a reference value.

Thus, the present invention has an outstanding advantage in that the apparatus is capable of reliably supplying strips of film consecutively to the printer.

The above and other objects, features and advantages of the invention will become more apparent from the following detailed description of the invention when read in conjunction with the accompanying drawings.

DESCRIPTION OF THE PREFERRED EMBODIMENTS

Figure 1:
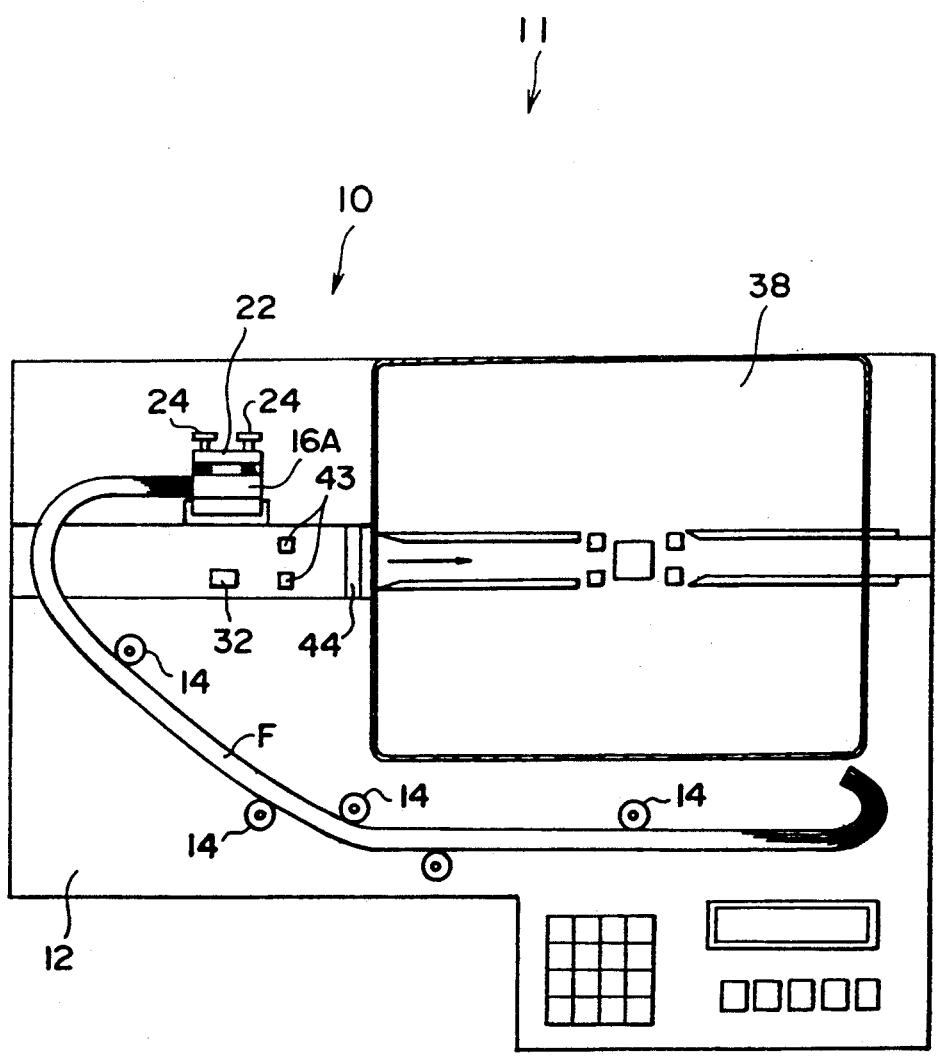
FIG. 1 is a plan view illustrating a first embodiment of a negative film printer having a negative film supplying apparatus to which the present invention is applied.
Figure 2:
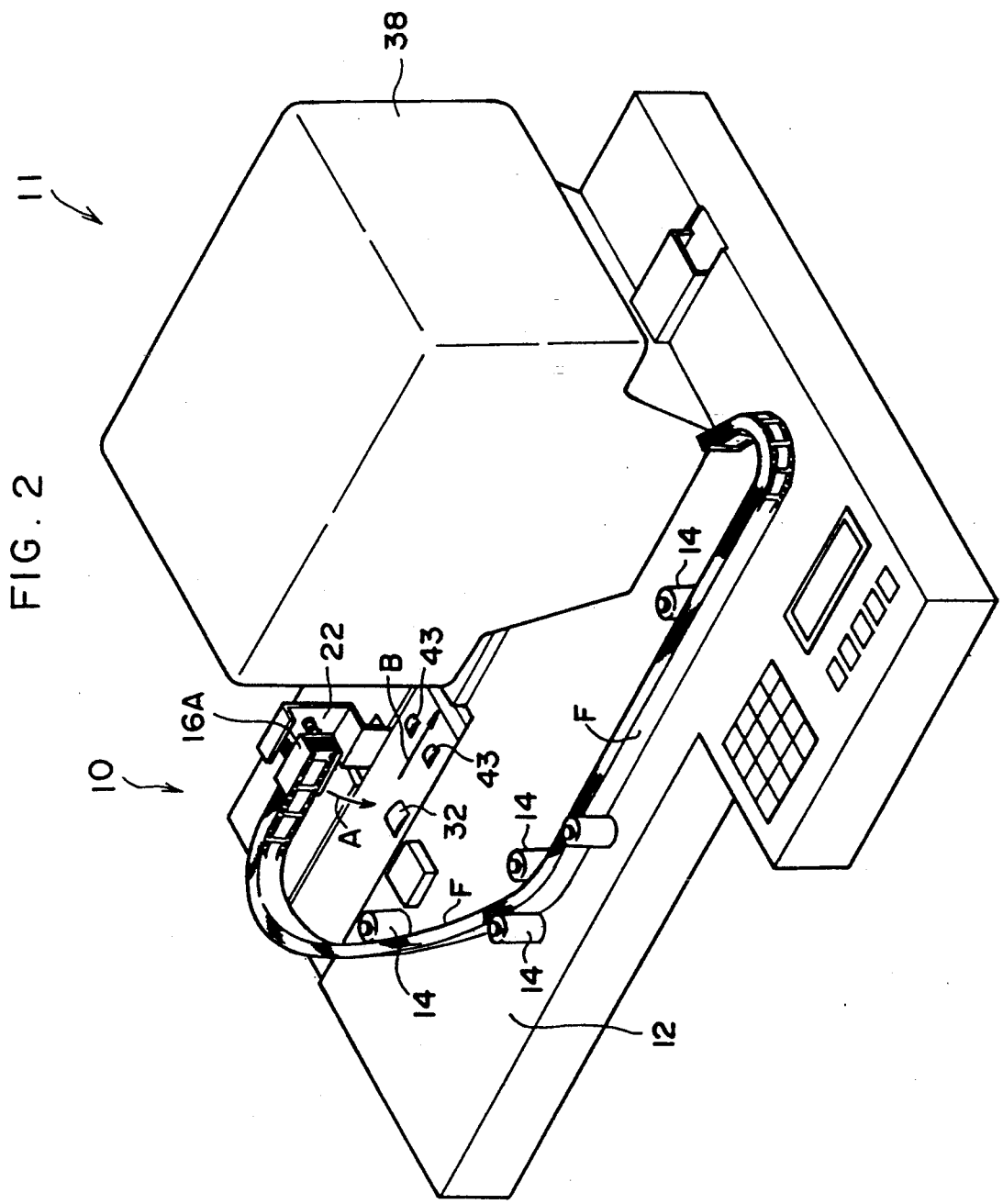
FIG. 2 is a perspective view of FIG. 1.

FIGS. 1 and 2 illustrate a negative film printer 11 having a negative supplying apparatus 10 in accordance with a first embodiment of the present invention.

Rolls of negative film F (hereafter simply referred to as the negatives F), after being subjected to development processing, are placed on a table 12 in a state in which a multiplicity of negatives are laminated (superposed one on top of another) and set in a curved state. These negatives F are arranged on the table 12 in such a manner that their transverse direction is set in the vertical direction. Guide rollers 14 are pivotally supported with their axes set vertically at appropriate locations on the table 12 in order to maintain an upright state, and are thus freely rotatable.

Figure 3:
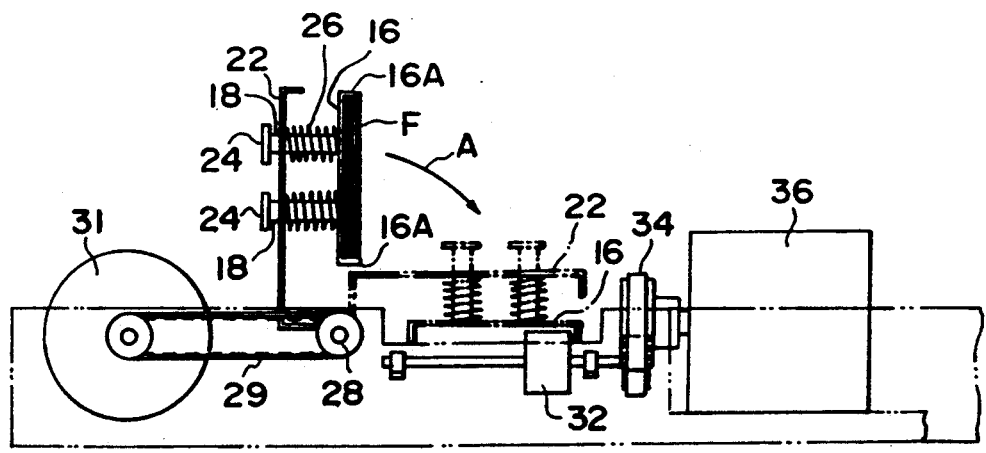
FIG. 3 is a side elevational view of a holder and its related components in accordance with the first embodiment.
Figure 4:
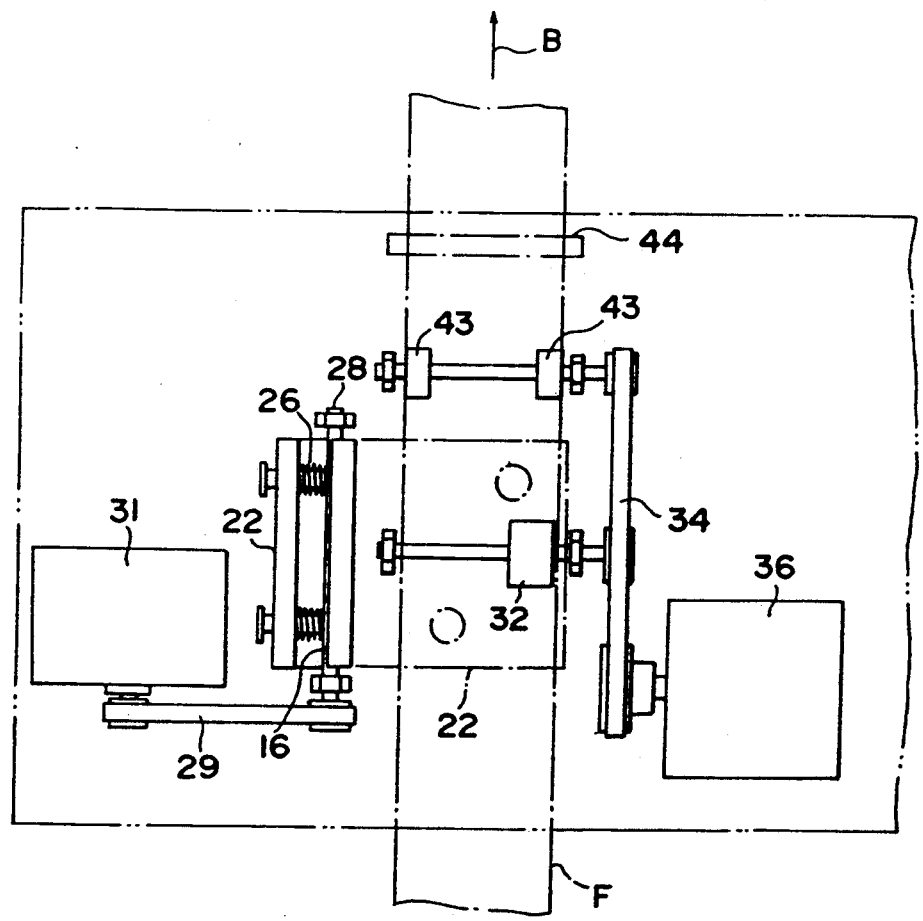
FIG. 4 is a plan view of FIG. 3.
Figure 5:
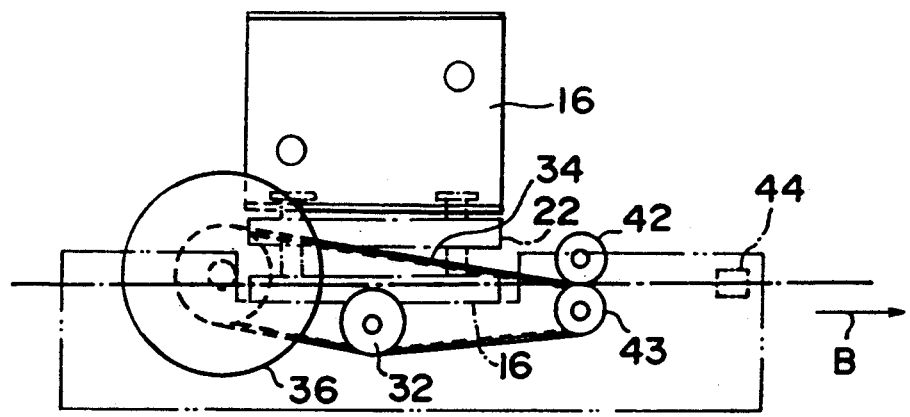
FIG. 5 is a right-hand side elevational view of FIG. 3.

FIGS. 3 to 5 illustrate a holder 16 which is a holding member for holding the leading end portions of the negatives F. This holder 16 is formed of a thin-walled plate member bent substantially in a U-shaped configuration. A pair of leg portions 16A, i.e., bent portions, are adapted to impart a nipping force to the edge portions of the negatives F so as to hold the multiplicity of negatives F in a laminated state. The interval between these leg portions 16A may be arranged in such a manner as to become gradually smaller (by an angle up to 30 degrees or thereabouts) toward a downstream end, as viewed in the direction of travel of the negatives F, of the holder 16. Preferably, very small projections and recesses, soft fibers or the like for holding the multiplicity of negatives F in a mutually spaced-apart state may be formed or embedded in the opposing surfaces of the legs 16A. As an example of this separating material, it is possible to use a cloth material in which tips of a multiplicity of fibers are bent or the diameters of the tips are enlarged, or in which opposite ends of a multiplicity of fibers are embedded so as to form loops.

Thus the negatives F are held by the holder 16 in such a manner that they are difficult to move in the transverse direction of the holder 16 but are readily movable in the longitudinal direction thereof.

The holder 16 has a pair of pins 18 projecting uprightly from an intermediate portion thereof and penetrating a rotating arm 22, a topper 24 being secured to each tip of the pins 18. A compression coil spring 26 is provided around each of the pins 18 so as to urge the holder 16 in the direction of causing the holder 16 to be spaced apart from the rotating arm 22. As shown in FIG. 3, the rotating arm 22 has one end secured to a rotating shaft 28 having an axis parallel with the longitudinal direction of the negatives F (a direction perpendicular to the plane of FIG. 3). This rotating shaft 28 is connected to a motor 31 via an endless belt 29 to receive a rotatively driving force, and is capable of rotating in the direction of arrow A from an upright state, i.e., a standby state, to a prostrate state, i.e., a feeding state, as shown in FIG. 3. In this feeding state, the holder 16 sets the transverse direction of the negatives F in the horizontal state, and the leading end portion of an innermost one, as viewed in the curved state, of the negatives F can be brought into direct contact with and can be pressed by a feed roller 32 which is partly exposed on the table 12. As shown in FIGS. 4 and 5, this feed roller 32 is connected to a motor 36 via an endless belt 34, and is adapted to feed the innermost one, as viewed in the curved state, of the negatives F to a printing section 38 in the direction of arrow B by means of the driving force of the motor 36.

A pair of nip/transport rollers 42 and a pair of nip/transport rollers 43 are disposed on the upper side and lower side, respectively, of the path of travel of the negatives F on the downstream side of the feed roller 32. The nip/transport rollers 43 are connected to the motor 36 via the endless belt 34 and are also capable of imparting a driving force to the negative F in the same way as the feed roller 32. The arrangement provided is such that the nip/transport rollers 42 are upwardly rotated through an operation by the operator so as to be spaced apart from the nip/transport rollers 43. In addition, a sensor 44 is disposed on the downstream side of the nip/transport rollers 42, 43, so that the driving of the printing section 38 can be controlled by detecting the leading and trailing ends of each of the negatives F. In addition, this sensor 44 also serves to control the amount of the negatives F being fed to the printing section 38, by detecting images formed on the negatives F.

A description will now be given of the operation of this embodiment. The plurality of negatives F, after being subjected to development processing, are held by the holder 16 with their leading end portions laminated (superposed one on top of another) therein. This holding by the holder 16 is effected by causing the leading ends of the negatives F to be pressed in the thicknesswise direction thereof from the right to the left. Intermediate portions and rear end portions of the plurality of the negatives F are also set in the laminated state, and are then set in a curved state while being guided by the guide rollers 14, as shown in FIG. 2.

Figure 6:
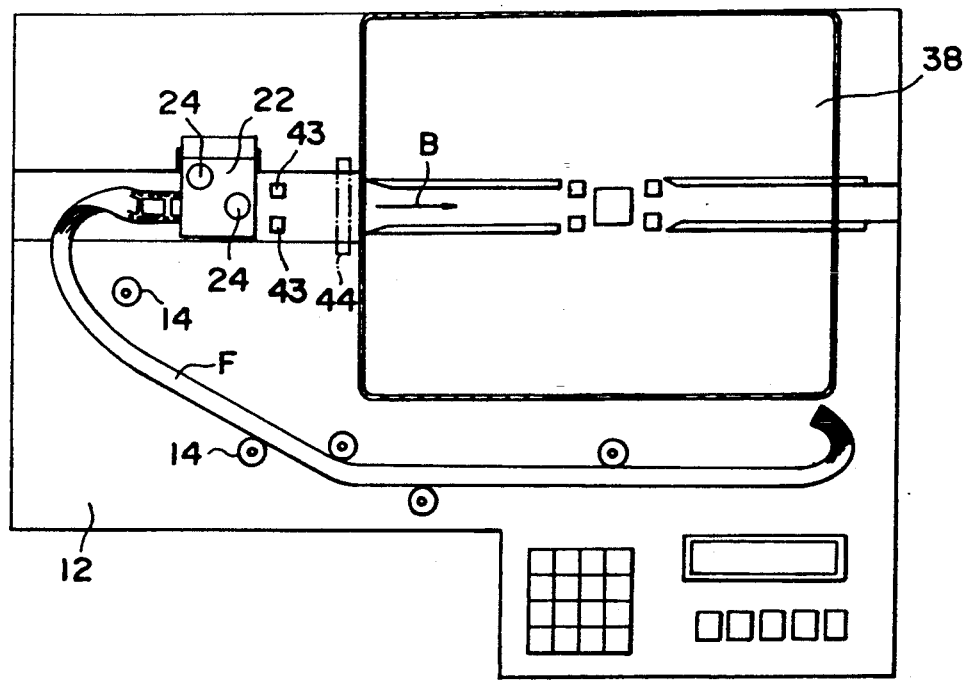
FIG. 6 is a plan view corresponding to FIG. 1 and illustrates a state in which negatives are consecutively fed.
Figure 7:
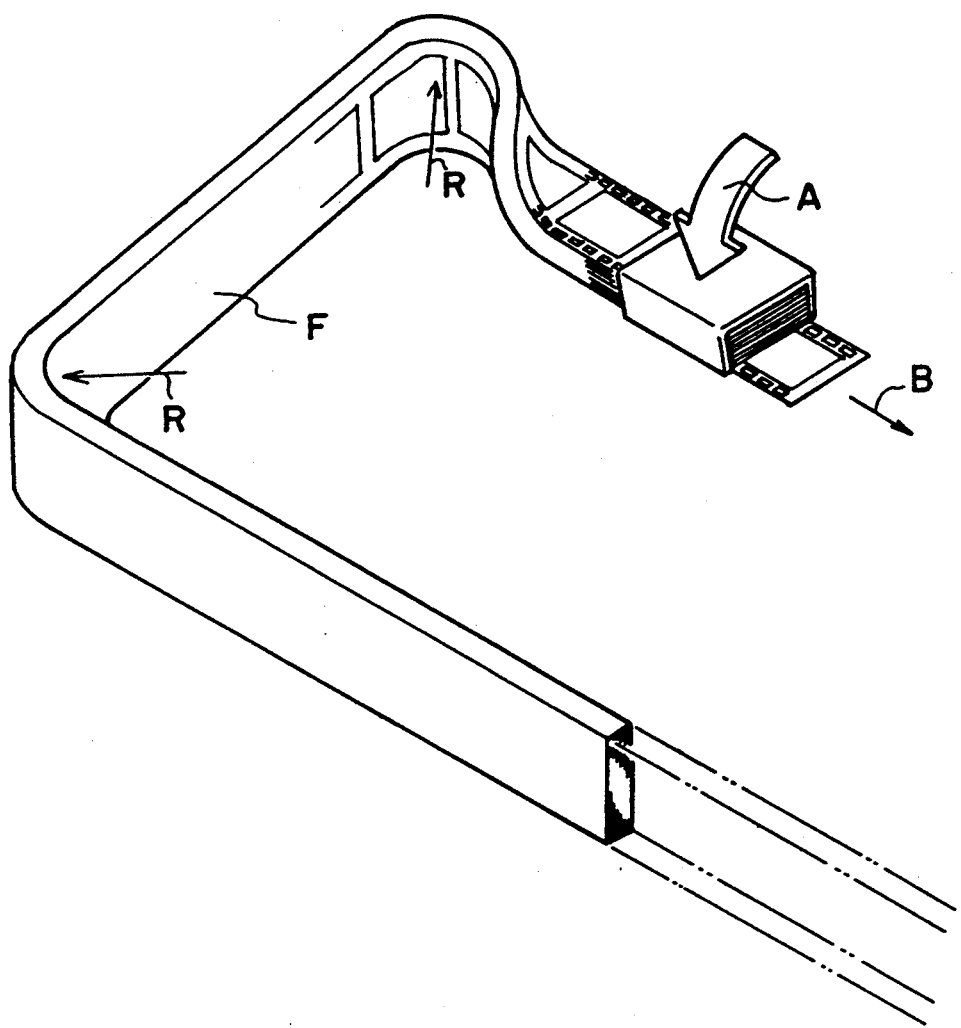
FIG. 7 is a perspective view illustrating the relationship between the negatives and the holder in FIG. 6.

If a printing start button is operated at this point, the motor 31 causes the rotating arm 22 to rotate together with the holder 16 from the standby state shown in FIG. 3 to the feeding state. Accordingly, as shown in FIGS. 6 and 7, only the leading end portions of the negatives F are rotated 90 degrees about the longitudinal direction, and the innermost one, as viewed in the curved state, of the negatives F is brought into direct contact with and is pressed against the feed roller 32. Concurrently, since the motor 36 rotates the feed roller 32, the innermost one, as viewed in the curved state, of the negatives F at its leading end portion passes through the nip/transport rollers 42, 43, and is fed to the printing section 38 in the direction of arrow B. In this feeding state, the innermost one, as viewed in the curved state, of the negatives F, which receives tension from the vicinity of the leading ends thereof, bends further in a direction in which its curve (particularly a radius of curvature R shown in FIG. 7) is reduced, so that a force acting in such a manner as to cause that negative F to move away from a second sheet of the negatives F is produced. Hence, even when the negative F is being fed to the printing section 38 in the longitudinal direction, no damage is caused to the images on the negatives.

Preferably, after the leading end portion of the innermost one, as viewed in the curved state, of the negatives F has been nipped by the nip/transport rollers 42, 43, the motor 31 is reversed to raise the holder 16 to its standby state. As a result, the feeding of the negative F becomes smoother. When the trailing end of the innermost one, as viewed in the curved state, of the negatives F is confirmed by the sensor 44, the motor 31 rotates again to cause the second sheet of the negatives F to be brought into direct contact with and be pressed by the feed roller 32, and that negative F is subjected to a longitudinally driving force and is fed to the printing section 38. Thus the inner ones, as viewed in the curved state, of the negatives F are consecutively supplied to the printing section 38. At that time, however, since a force which causes the curve of the negative F being transported to be reduced is produced in that negative F, it is possible to prevent damage from being caused to the negatives.

Figure 8:
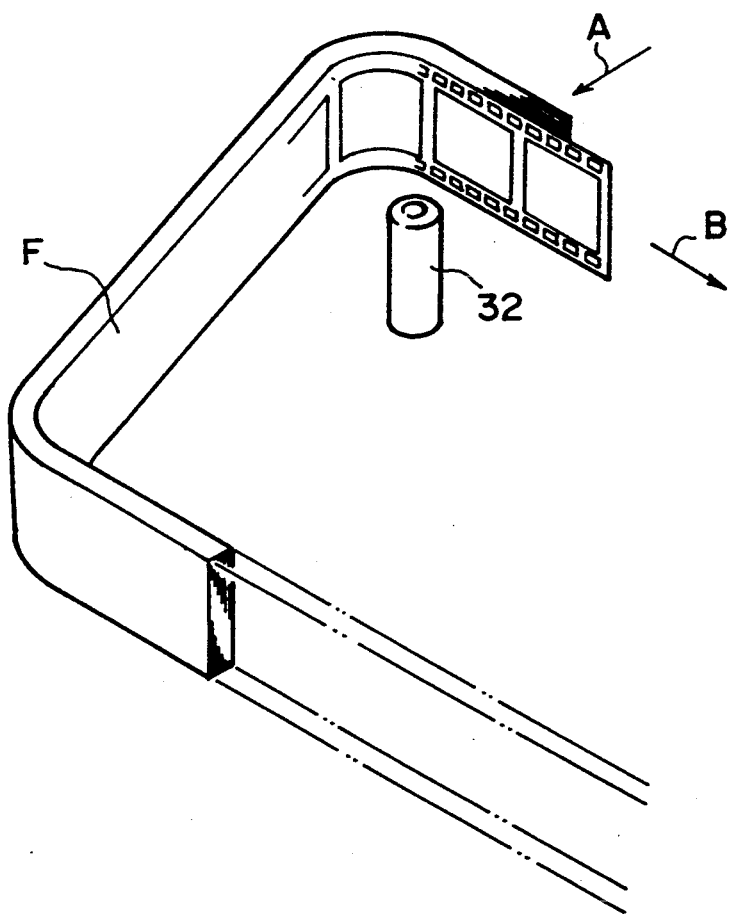
FIG. 8 is a perspective view of a modification illustrating a state in which the negatives are consecutively fed to a printing section with the transverse direction of the negatives set in the vertical direction.

In the above-described embodiment, if the holder 16 is detachably engaged with the rotating arm 22, the holder 16 can be attached to the rotating arm 22 after the leading end portions of the multiplicity of negatives F are held by the holder 16. The operational efficiency can thereby be improved. In addition, although in the above-described embodiment an arrangement has been shown in which the holder, while being rotated, is made to approach the feed roller 32, an arrangement may be alternatively provided such that the negatives F are pressed against the feed roller 32 by moving the holder 16 linearly, i.e., by vertically moving the holder 16 in the state shown in FIG. 7. In addition, as for the negatives F, the leading end portions may not be rotated 90 degrees in the manner shown in FIGS. 6 and 7, and the driving force of the roller disposed with its axis arranged vertically may be imparted to the innermost one, as viewed in the curved state, of the negatives set in the state shown in FIGS. 1 and 2, as shown in FIG. 8. In this case, that negative is rotated 90 degrees at a midway position while being transported to the printing section 38, or the optical axis for printing in the printing section 38 is set in a direction in which that optical axis is rotated 90 degrees (in a direction perpendicular to the plane of FIG. 5) as compared with the vertical direction in FIG. 5.

Figure 9:
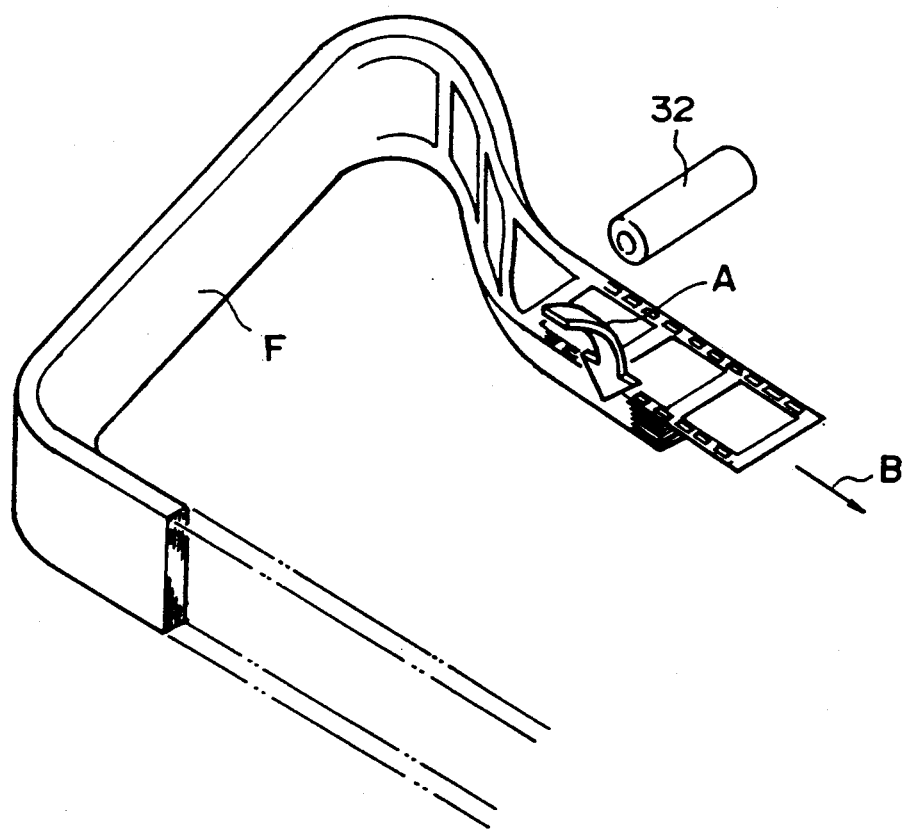
FIG. 9 is a perspective view illustrating a state in which leading ends of the negatives are rotated in a direction opposite to that in the case of FIG. 7 to feed each negative to the printing section.

Further, the leading end portions of the negatives F may be rotated in a direction opposite to that of FIG. 7, as shown in FIG. 9. In this case, the innermost one, as viewed in the curved state, of the negatives F can be consecutively fed as the negatives F starting with an uppermost one of the negatives F, whose transverse direction has been set in the horizontal direction by being rotated, are each brought into contact with the roller 32 with its axis arranged vertically and are fed to the printing section 38.

It should be noted that in the above-described embodiment, in order to impart the driving force to the negative in the longitudinal direction, an arrangement may be alternatively provided such that the roller is moved into contact with the negative, instead of moving the negative into contact with the roller.

In addition, although in the above-described embodiment the multiplicity of laminated negatives are merely bent in the curved state and are set on the table 12, the negatives may be set in other forms, as by disposing them by winding the trailing ends of the negatives so as to form loops.

Figure 10:
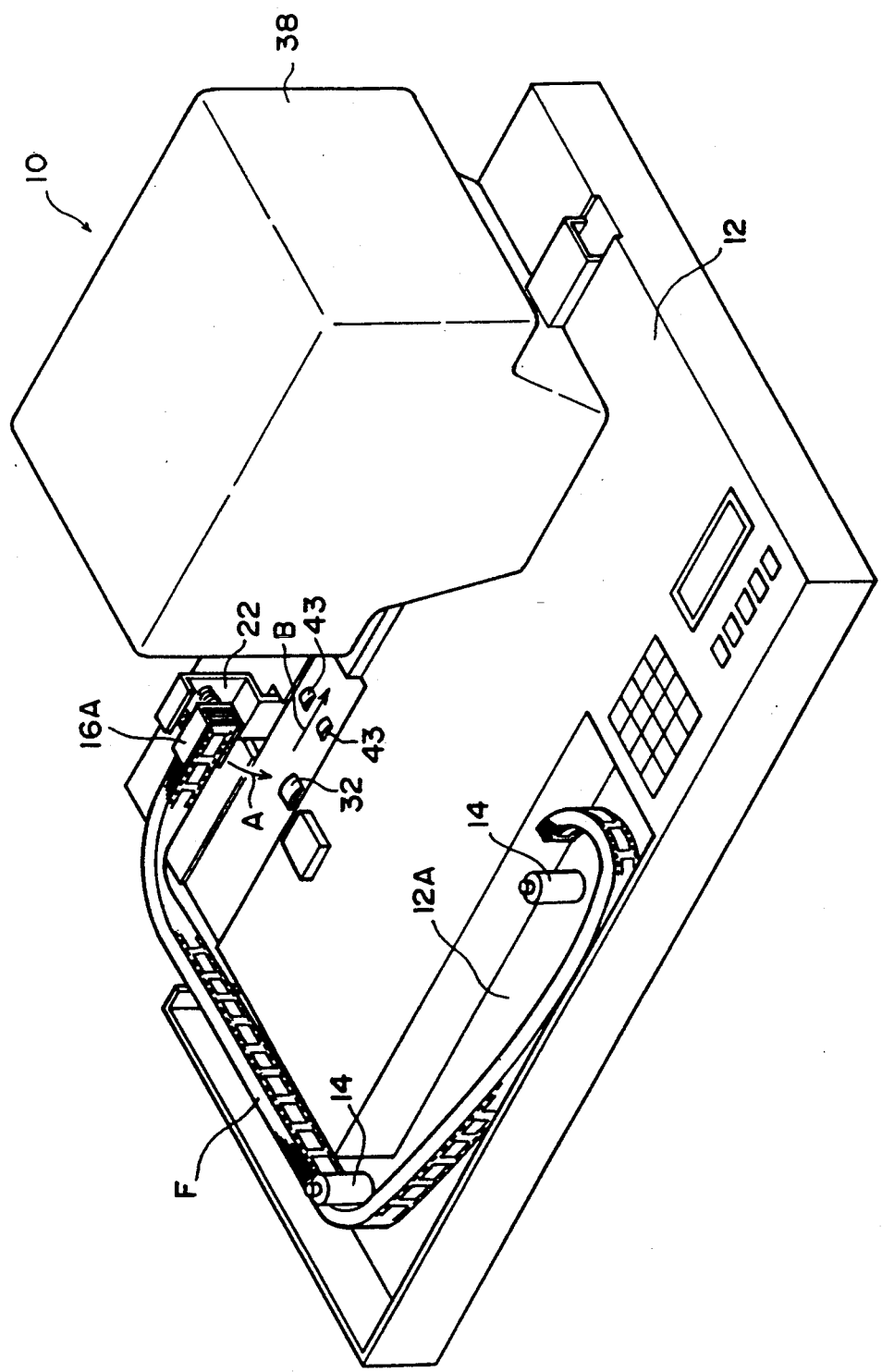
FIG. 10 is a perspective view illustrating a modification in which a recess is formed in a table so as to accommodate the negatives therein.

Moreover, an arrangement may be provided, as shown in FIG. 10, such that an L-shaped recess 12A in terms of its plan view is formed in the table 12 to accommodate the intermediate and rear end portions of the negatives F therein. The depth of this recess 12A is set to be not less than the width of the negatives F, so that the negatives F do not hamper the operator's work on the table 12.

Next, a detailed description will be given of a second embodiment of the present invention.

In the description of this embodiment, the same reference numerals as those employed in the first embodiment will be used with respect to the arrangements, members, components, and the like similar to those of the first embodiment, and a description thereof will be omitted.

Figure 11:
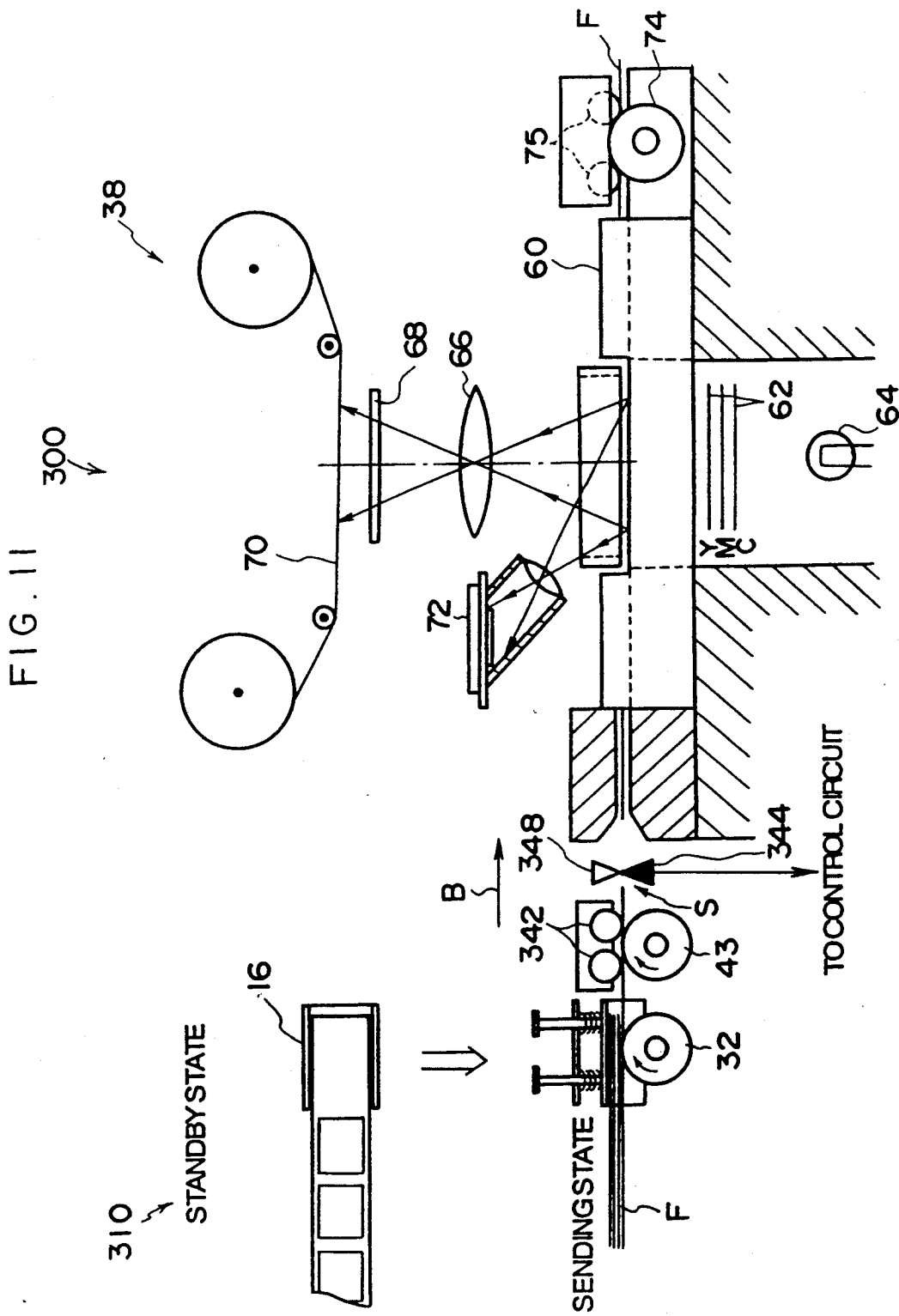
FIG. 11 is a schematic diagram of a photographic printer illustrating a second embodiment of the present invention.

FIG. 11 shows a schematic diagram of a photographic printer 300. The photographic printer 300 has a negative film supplying apparatus 310. This negative film supplying apparatus 300 is arranged substantially in the same way as the negative film supplying apparatus 10 in accordance with the first embodiment. Therefore, a description will be given of only those arrangements that differ from the negative film supplying apparatus 10.

Two pairs of nip/transport rollers 342 corresponding to the nip/transport rollers 42 disposed on the downstream side, as viewed in the direction of travel of the negatives, of the feed roller 32 are disposed on the upper side of the path of travel of the negatives F along the direction of travel thereof. As in the case of the first embodiment, the pair of nip/transport rollers 43 are connected to the motor 36 via the endless belt 34 and are also capable of imparting a driving force to the negative F in the same way as the feed roller 32. The nip/transport rollers 342 are secured to the table 12 by means of metal fittings.

Figure 18:
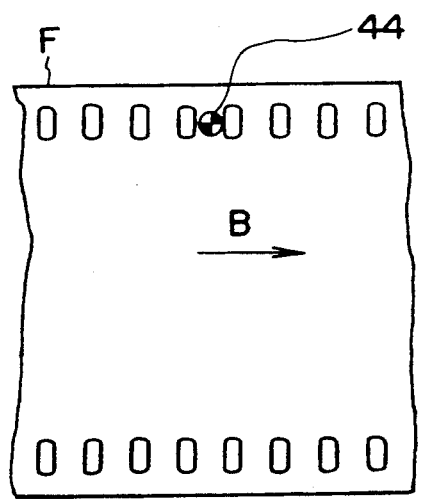
FIG. 18 is a diagram of a film illustrating a position where a sensor in accordance with the second embodiment is disposed.

A sensor S comprised of a light-emitting element 348 and a light-receiving element 344 is disposed on the downstream side, as viewed in the direction of travel of the negatives, of the nip/transport rollers 342, 43 at a position where the negative F passes between the light-emitting element 344 and the light-receiving element 348 and the passage of perforations P formed in the negative F, as shown in FIG. 18, can be detected. A photoelectric conversion device such as a photodiode may be used as the light-receiving element 344, while a light emitter such as an LED may be used as the light-emitting element 348.

Figure 12:
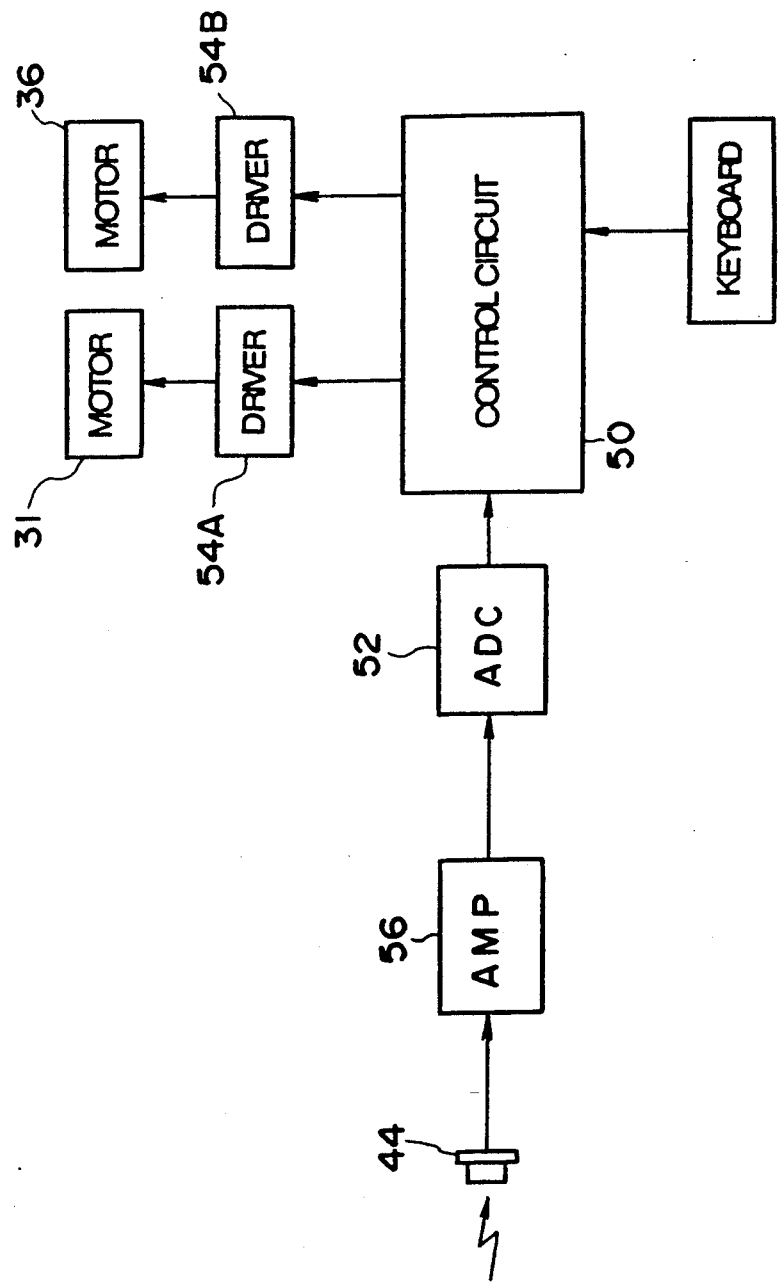
FIG. 12 is a block diagram illustrating a control circuit and its peripheral components in accordance with the second embodiment.

In this embodiment, a photodiode is used as the light-receiving element 344. The light-receiving element 344 is connected to a control circuit 50 via an amplification circuit 56 and an analog-digital converter (ADC) 52, as shown in FIG. 12. Also, the motor 31 and the motor 36 are connected to the control circuit 50 via a motor driver 54A and a motor driver 54B, respectively, and a keyboard is also connected thereto.

A description will now be given of the printing section 38.

As shown in FIG. 11, a negative carrier 60 for consecutively transporting the negatives F to a printing position is provided in the printing section 38. A light-adjusting filter 62 consisting of three color filters, i.e., Y, M, and C filters, and a halogen lamp 64 are disposed below the negative carrier 60. A lens 66, a shutter 68, and color paper 70 are arranged in order above the negative carrier 60, and are arranged such that rays of light emitted from the halogen lamp 64 and transmitted through the light-adjusting filter 62 and the negative F form an image on the color paper 70 by means of the lens 66. In addition, a two-dimensional image sensor 72 for effecting photometry by dividing the negative image into a multiplicity of segments is disposed at a position capable of photometrically measuring the image density of the negative F and in a direction inclined with respect to the optical axis of an image-forming optical system. It should be noted that nip/transport rollers 74, 75 are disposed on the downstream side of the negative carrier 60. As the nip/transport rollers 74, 75 rotate by means of a driving force imparted thereto from an unillustrated driver, the negative F fed into the printing section 38 is fed out therefrom.

A description will be given hereafter of the operation of this embodiment together with the control of film supply. In the description of the operation of this embodiment, since the negative film supplying apparatus 310 is arranged in substantially the same way as the negative film supplying apparatus 10 of the first embodiment, the description of portions of the negative supplying apparatus 310 will be made with reference to not only FIG. 11 for this embodiment but also FIGS. 1 to 3 for the first embodiment.

The plurality of negatives F, for which the development operation has been completed, are held by the holder 16 with their leading end portions laminated therein. In the same way as in the first embodiment, this holding by the holder 16 is effected by causing the leading ends of the negatives F to be pressed in the thicknesswise direction thereof from the right to the left. Intermediate portions and rear end portions of the plurality of the negatives F are also set in the laminated state, and are then set in a curved state while being guided by the guide rollers 14, as shown in FIG. 2 illustrating the first embodiment.

Figure 14:
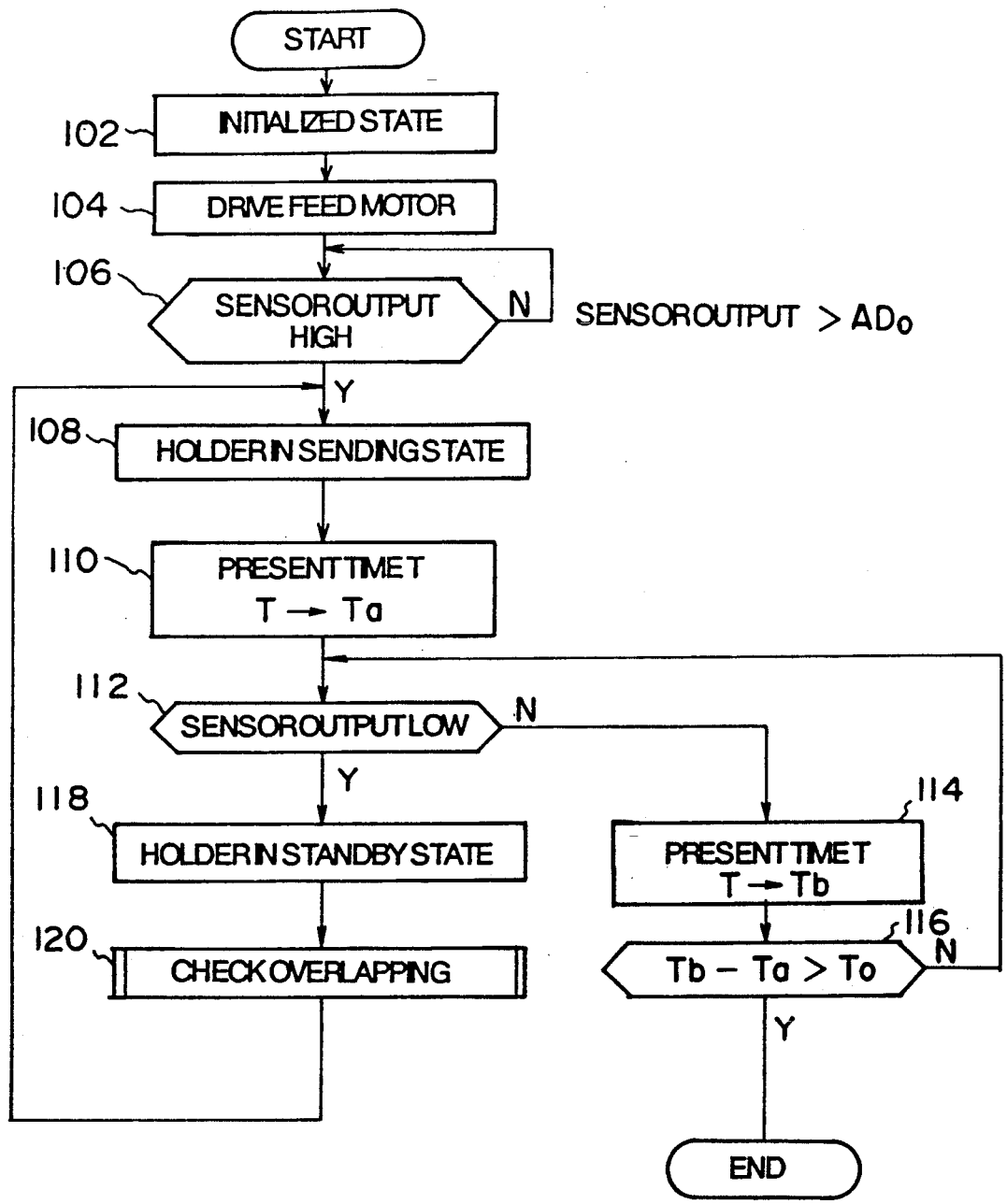
FIG. 14 is a flowchart illustrating a control routine in accordance with the second to fourth embodiments of the present invention.

FIG. 14 shows a main routine for film supplying control. When the operator operates the printing start button, this main routine is started. In Step 102, the initialization of the apparatus is carried out, and the holder is set in a standby state. In addition, the initialization of variables used for a control program is also carried out, and predetermined values are fetched as a value $AD_0$, a time duration $T_0$, and a time duration $T_P$, whereupon the operation proceeds to Step 104.

It should be noted that, as the value $AD_0$, a value is used in which a substantially intermediate value between the value of the amount of light received from the light-emitting element 348 by being transmitted through a base portion of the negative F, on the one hand, and the value of the amount of light received directly from the light-emitting element 348 without being transmitted through the negative F, on the other, is converted to a digital value. As the time duration $T_0$, a time duration during which the negative F is transported from the feed roller 32 to the sensor S at a fixed transport speed is used. As the time duration $T_P$, a time duration during which light passing through one perforation in one negative F is received in a case where the negative F is transported at a fixed transport speed is used, i.e., the length of one perforation in the transport direction is used.

In Step 104, as the motor 36 is driven via the motor driver 54B, the feed roller 32 is rotated, thereby enabling the negative F to be transported. In Step 106, the presence or absence of the negative F is determined depending on the amount of light received by the light-receiving element 344. If the output of the light-receiving element 344 is greater than the value $AD_0$, a determination is made that the light received by the light-receiving element 344 was received directly from the light-emitting element 348 without being transmitted through the negative F, i.e., that the negative F is absent, and the operation proceeds to Step 108. In Step 108, the motor 31 is driven via the motor driver 54A to rotate the rotating arm 22 together with the holder 16 from the standby state, shown in FIG. 3 showing the first embodiment, to the sending state.

Only the leading end portions of the negatives F are rotated 90 degrees about the longitudinal direction, and the innermost one, as viewed in the curved state, of the negatives F is brought into direct contact with and is pressed against the feed roller 32. Consequently, the innermost one, as viewed in the curved state, of the negatives F at its leading end portion passes through the nip/transport rollers 342, 43, and is fed to the printing section 38 in the direction of arrow B. In this feeding state, the innermost one, as viewed in the curved state, of the negatives F, which receives tension from the vicinity of the leading ends thereof, bends further in a direction in which its curve is reduced, so that a force acting in such a manner as to cause that negative F to move away from the second sheet of the negatives F is produced. Hence, even when the negative F is being fed to the printing section 38 in the longitudinal direction, no damage is caused to the images on the negatives.

In Step 110, the time T, when the rotating arm 22 together with the holder 16 was rotated from the standby state to the sending state, is read and stored in an unillustrated register as the time $T_a$, and the operation proceeds to Step 112. In Step 112, a determination is made as to whether or not the signal inputted to the light-receiving element 344 is less than $AD_0$. If the output of the light-receiving element 344 is less than $AD_0$, since the signal has become less than $AD_0$ for the first time, a determination is made that the leading end of the negative F has been reached, and the operation proceeds to Step 118. In Step 118, the motor 31 is driven to rotate the rotating arm 22 together with the holder 16 from the sending state shown in FIG. 3 to the standby state, and the operation proceeds to Step 120 where a subroutine for checking the overlapping of the negatives F, which will be described later, is executed. This subroutine for checking the overlapping of the negatives F is executed from the time when the leading end of the negative F has been detected until the rear end thereof is detected. Upon completion of this subroutine, the operation returns to Step 108. Meanwhile, if the output of the light-receiving element 344 is greater than the value $AD_0$ in Step 112, it is the case where the light received by the light-receiving element 344 was received directly from the light-emitting element 348 without being transmitted through the negative F. Hence, a determination is made that the negative F has not been reached, so that in Step 114 the present time T is read and stored in the unillustrated register as the time $T_b$, and the operation proceeds to Step 116. In Step 116, a determination is made as to whether or not $T_b - T_a > T_0$, and if it is within the predetermined time duration $T_0$, the operation returns to Step 112. If it exceeds the predetermined time duration $T_0$, since no negative has been detected despite the fact that the holder 16 was set in the sending state, a determination is made that the sending of all the negatives F in the holder 16 has been completed, so that this control routine ends.

In the manner described above, after the leading end of the innermost one, as viewed in the curved state, of the negatives F has been detected by the sensor S, the motor 31 is reversed to raise the holder 16 up to its standby state. As a result, the pressing of the plurality of laminated negatives F by the feed roller 32 is canceled, with the result that the feeding of the negative F becomes smoother. When the checking of an overlapping with respect to the innermost one, as viewed in the curved state, of the negatives F is completed, as will be described later, and the rear end of the negative F is detected by the sensor S, in Step 108, the motor 31 is rotated to cause the holder 16 to rotate from the standby state to the sending state. Then, as the second negative F is brought into direct contact with and is pressed by the feed roller 32, the negatives F starting with that negative F are subjected to a longitudinally driving force and are consecutively supplied to the printing section 38.

Figure 20:
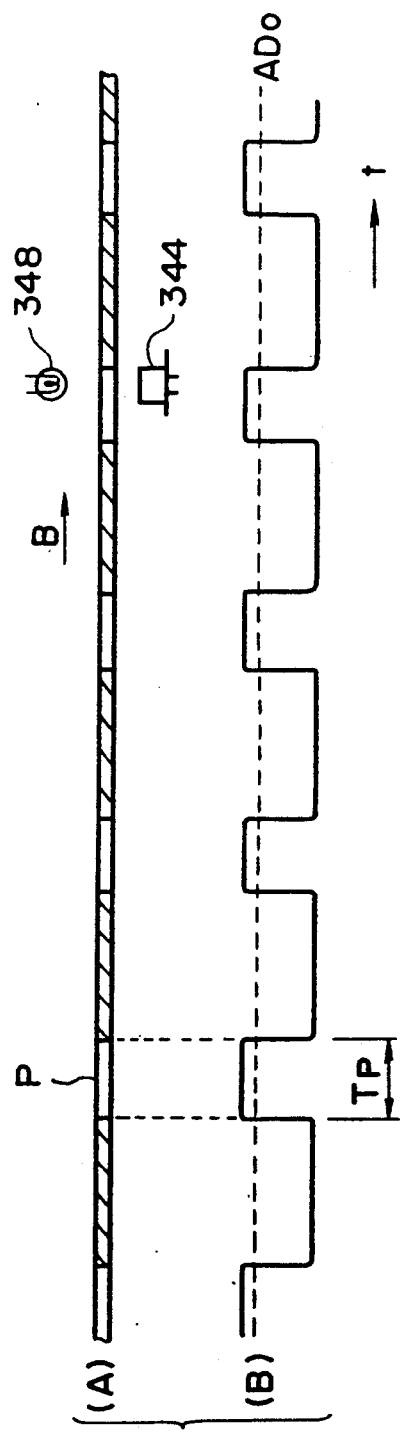
FIG. 20A is a longitudinal cross-sectional view of a strip of negative film, including perforations, in accordance with the second embodiment.
FIG. 20B is a diagram illustrating an output signal of a sensor.
Figure 21:
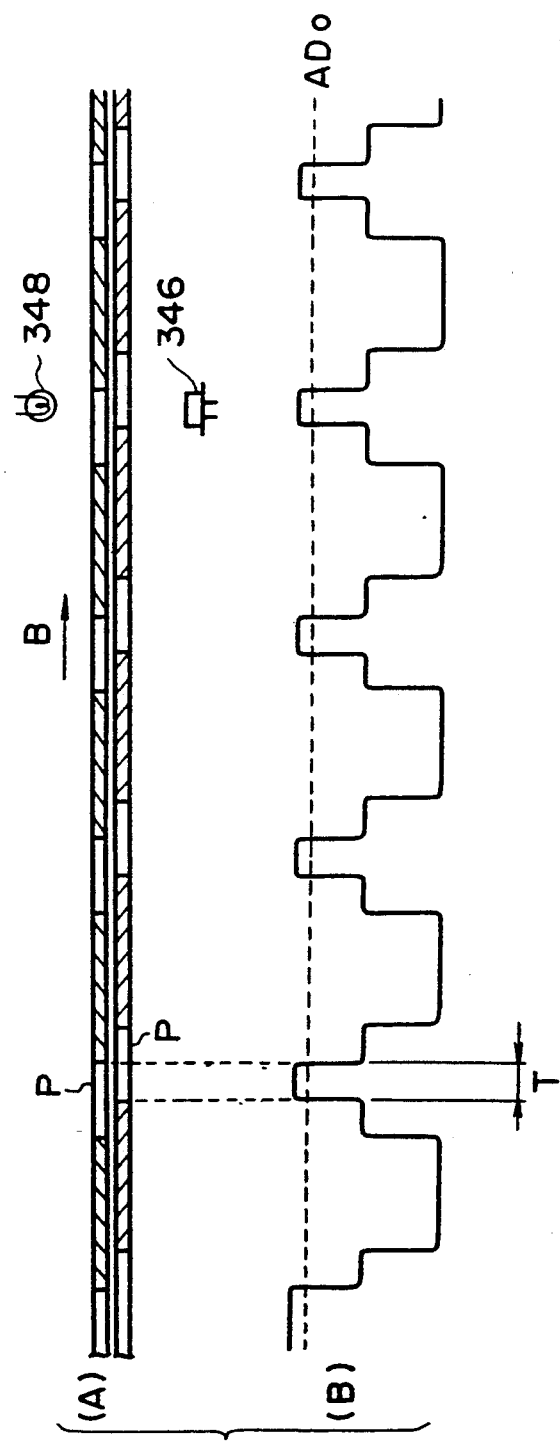
FIG. 21A is a longitudinal cross-sectional view of two overlapping strips of negative film, including perforations, in accordance with the second embodiment.
FIG. 21B is a diagram illustrating an output signal of the sensor.

At this point, in a case where one negative F has moved at a fixed speed between the light of the light-emitting element 348 and the light-receiving element 344, as shown in FIG. 20A, the output signal of the light-receiving element 344 becomes such as the one shown in FIG. 20B. The time duration $T_P$ during which the light from the light-emitting element 348 was directly received without being transmitted through the negative F corresponds to the length of the perforation in the transport direction thereof. However, if two negatives F overlap, as shown in FIG. 21A, the positions of the perforations P in the two negatives F relative to each other are offset from each other. Hence, the light received by the light-receiving element 344 can be classified into three types, direct light which was not transmitted through the base portion of the negative F, light which was transmitted through one negative F, and light which was transmitted through two negatives F. For this reason, in a case where a plurality of negatives F overlap, in terms of the signal waveform obtained by the light-receiving element 344, the time duration during which the light from the light-emitting element 348 was directly received without being transmitted through the negatives F becomes shorter than the time duration $T_P$ during which the light passing through one perforation was received. Accordingly, by determining whether the time during which the light from the light-emitting element 348 was directly received without being transmitted through the negatives F is less than a predetermined value, it is possible to determine whether or not a plurality of negatives F have been supplied simultaneously.

Figure 15:
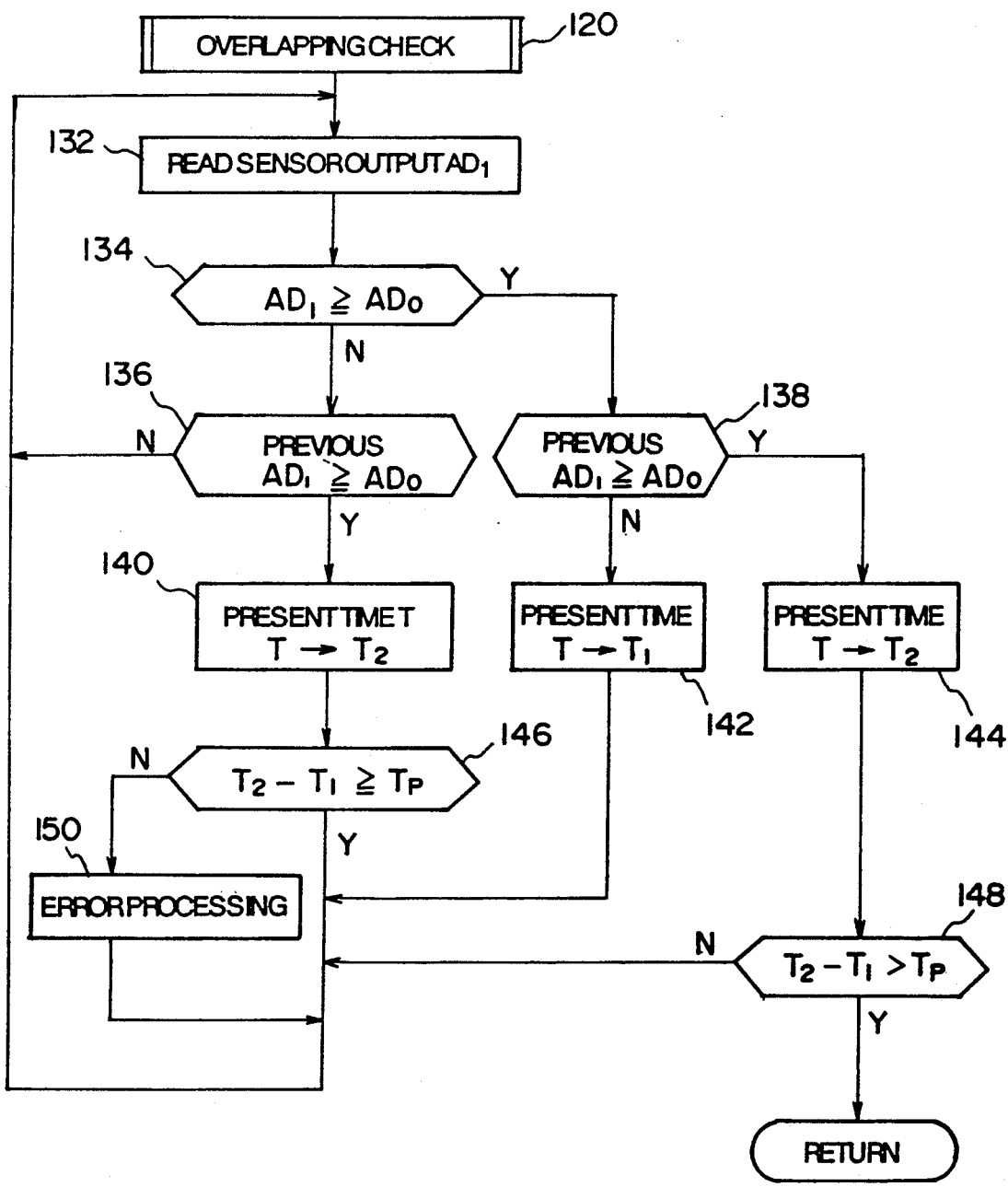
FIG. 15 is a flowchart illustrating control of a film-overlapping check in accordance with the second embodiment.

FIG. 15 illustrates a subroutine for checking the overlapping of the negatives by detecting the perforations in the negatives F. In Step 132, a value $AD_1$ obtained by converting the output of the light-receiving element 344 to a digital value is read. In Step 134, a determination is made as to whether the light is light transmitted through the base portion of the negative or is direct light, and if the value $AD_1 <$ the reference value $AD_0$, a determination is made that the light has been transmitted through the base portion of the negative, and the operation proceeds to Step 136. In Step 136, a determination is made as to whether or not $AD_1 \geq AD_0$ when the previous $AD_1$ value was read, i.e., whether or not the light was the light transmitted through the base portion of the negative. If the previous $AD_1$ value was such that $AD_1 < AD_0$, a determination is made that there has been no change in the amount of light received by the light-receiving element 344 and the base portion is being fed, and the operation returns to Step 132. Meanwhile, if the previous $AD_1$ value was such that $AD_1 \geq AD_0$, since the present amount of light has become smaller than the previous one, a determination is made that the object being detected has shifted from the perforation to the base portion (representing a fall), and the operation proceeds to Step 140. In Step 140, the present time T is read and stored in the unillustrated register as the time $T_2$, and the operation proceeds to Step 146. In Step 146, a comparison is made between, on the one hand, the time duration during which the light was received through the perforation in the negative F, $T_2 - T_1$, i.e., the time duration corresponding to the length of the perforation in the transport direction, and, on the other hand, the time duration $T_P$ during which the light passing through the perforation in one negative F was received, so as to determine whether or not the negatives F overlap. If $T_2 - T_1 \geq T_P$, the time duration corresponding to the length of the perforation in the transport direction thus detected is more than the time duration $T_P$ during which the light passing through the perforation in one negative F is received, so that it is determined that the negatives F do not overlap, and the operation returns to Step 132. Since the length of the perforations in the transport direction in a case where the adjacent ones of the negatives F are offset becomes shorter than the length of the perforation in one negative F, if $T_2 - T_1 < T_P$, a determination is made that a plurality of negatives F are present, and the operation proceeds to Step 150. In Step 150, error processing which will be described later is executed, and the operation returns to Step 132.

Meanwhile, if, in Step 134, the output value $AD_1$ of the light-receiving element 344 is not less than the reference value $AD_0$, a determination is made that the light from the light emitting element 348 has been directly received without being transmitted through the negative F, and the operation proceeds to Step 138. In Step 138, a determination is made as to whether or not $AD_1 \geq AD_0$ when the previous $AD_1$ value was read, i.e., whether or not the light was light transmitted through the base portion of the negative. If the previous $AD_1$ value was such that $AD_1 < AD_0$, the present amount of light received by the light-receiving element 344 has become greater than the previous amount, so that a determination is made that an object being detected has shifted from the base portion of the negative to the perforation (representing a rise), and the operation proceeds to Step 142. In Step 142, the present time T is read and stored in the unillustrated register as the time $T_1$, and the operation returns to Step 132. On the other hand, if the previous $AD_1$ value was such that $AD_1 \geq AD_0$, since there has been no change in the amount of light received by the light-receiving element 344, a determination is made that the light from the light-emitting element 348 is being directly received without being transmitted through the negative F. The operation then proceeds to Step 144 wherein the present time T is read and is stored in the unillustrated register as the time $T_2$ for updating the time when the light from the light-emitting element 348 is being directly received without being transmitted through the negative F, and the operation proceeds to Step 148. In Step 148, a determination is made as to whether or not the time duration $T_2 - T_1$ during which the light from the light-emitting element 348 is being directly received without being transmitted through the negative F is not less than the time duration $T_P$ during which the light is received through the perforation. If $T_2 - T_1 < T_P$, a determination is made that the time duration during which the light from the light-emitting element 348 is being directly received is within the range of the length of the perforation P in the transport direction, and the operation returns to Step 132. If $T_2 - T_1 > T_P$, the light from the light-emitting element 348 is being directly received for a duration greater than the length of the perforation P in the transport direction, so that a determination is made that a predetermined time has elapsed upon completion of the supply of one negative, and this routine ends.

Figure 23:
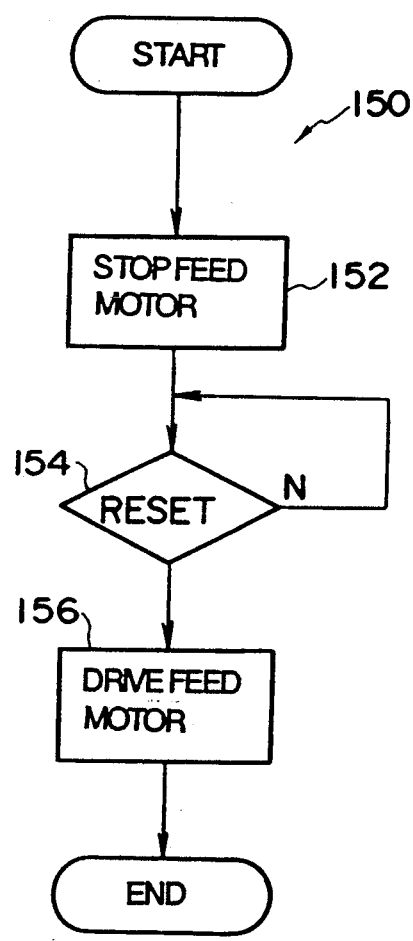
FIG. 23 is a flowchart illustrating error processing in accordance with the second to fourth embodiments of the present invention.

Next, a description will be given of error processing at a time when a plurality of negatives F have overlapped. As shown in FIG. 23, in Step 152, the motor 36 is stopped to stop feeding the negatives F, an unillustrated alarm is sounded, and the operation proceeds to Step 154. At this point, the operator, upon hearing the alarm, removes the plurality of negatives F which have been supplied in an overlapping manner. After setting one negative F for which a printing operation is to be effected, the operator presses an unillustrated restart switch. In Step 154, a determination is made as to whether or not the restart switch has been pressed by the operator, and after the restart switch has been pressed by the operator, the operation proceeds to Step 156. In Step 156, the motor 36 is driven to restart the feeding of the negatives F, and as the operation returns to executing the interrupted program, error processing ends.

In the above-described manner, whether or not a plurality of negatives F have been fed is determined by detecting the time duration corresponding to the length of the perforation P in the negative F. Thus, since a plurality of negatives F are prevented from being fed in a superposed manner, it is possible to prevent faulty printing due to the overlapping of the plurality of negatives F.

It should be noted that although in the above-described second embodiment whether or not a plurality of negatives F have been fed is determined by optically detecting the time duration corresponding to the length of the perforation P in the negative F, the determination may be made by mechanically measuring the length of the perforation P.

In the above-described second embodiment, a description has been given of a case where whether or not a plurality of negatives F have been fed is determined by detecting the time duration during which the light passing through the perforation in the negative F is received, i.e., the length of the perforation in the transport direction, in a case where the negatives F are consecutively fed at a fixed transport speed. However, there are cases where a determination is made erroneously owing to damage or the like of the perforation P. Accordingly, as a third embodiment, a description will be given of a case where whether or not a plurality of negatives F have been fed is determined by detecting adjacent images recorded on the negative F.

Figure 13:
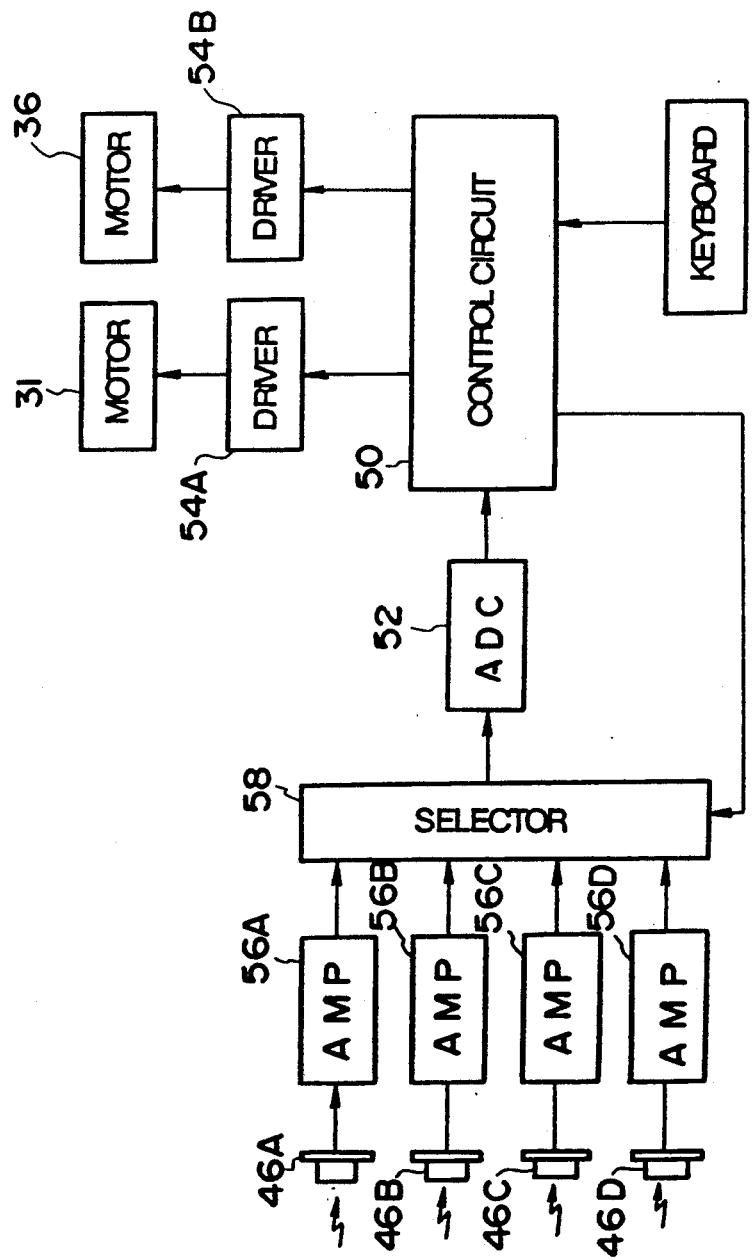
FIG. 13 is a block diagram illustrating the control circuit and its peripheral components in accordance with a third embodiment.
Figure 19:
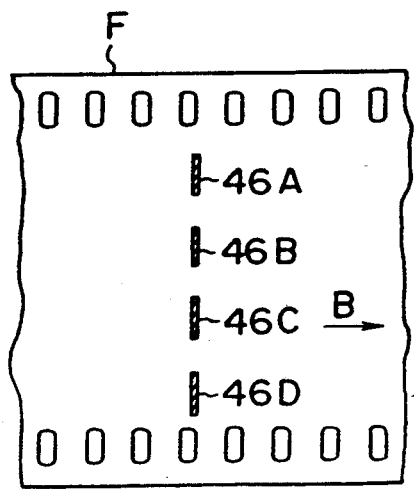
FIG. 19 is a diagram of a film illustrating a position where sensors in accordance with the second embodiment are disposed.

Since the arrangement of this third embodiment is substantially similar to the arrangement of the second embodiment, identical portions will be denoted by the same reference numerals as those of the second embodiment, and a detailed description thereof will be omitted. In the third embodiment, as shown in FIG. 13, a plurality of image sensors 46A, 46B, 46C, 46D are disposed on the downstream side of the nip/transport rollers 342, 43. Light emitted from unillustrated light-emitting elements disposed in correspondence with the image sensors 46A, 46B, 46C, 46D is made incident upon these image sensors. These members are arranged in such a manner that the negative F will pass between the image sensors 46A, 46B, 46C, 46D and the light-emitting elements. Also, as shown in FIG. 19, the image sensors 46A, 46B, 46C, 46D are arranged at predetermined intervals in a direction perpendicular to the longitudinal direction of the negative F and at positions at which they are capable of detecting the image on the negative F. As for the plurality of image sensors 46A, 46B, 46C, 46D, the number of the image sensors used and their positions can be selectively used depending on the type of negative F (e.g. half size, full size, and panorama size).

As shown in FIG. 13, the image sensors 46A, 46B, 46C, 46D are connected to a selector 58 via amplification circuits 56A, 56B, 56C, 56D, respectively. The selector 58 is connected in such a way that a selection signal from the control circuit 50 is inputted to the selector 58. Specifically, the selector 58 is connected to the control circuit 50 via the ADC 52 in such a manner as to output a signal of an image sensor selected from a plurality of signals inputted thereto from the image sensors. Also, the motor 31 and the motor 36 are connected to the control circuit 50 via the motor driver 54A and the motor driver 54B, respectively, and a keyboard is also connected thereto.

A description will be given hereafter of the operation of the third embodiment. The feeding of the negative F is started according to a main routine for controlling film supply shown in FIG. 14. At this time, the following values are used as predetermined values for initializing the apparatus in Step 102. As a value $AD_f$, a value is used in which a substantially intermediate value between, on the one hand, an analog value of the amount of light transmitted through a portion of one negative F where no images are recorded, i.e., a film base portion, and, on the other hand, the value of the amount of light received directly from the light-emitting element without being transmitted through the negative F, is converted to a digital value. As a time duration $T_f$, a time duration is used during which light transmitted through the film base portion between adjacent frame images of one negative F where no image is recorded is received in a case where the negative F is transported at a fixed transport speed.

Figure 22:
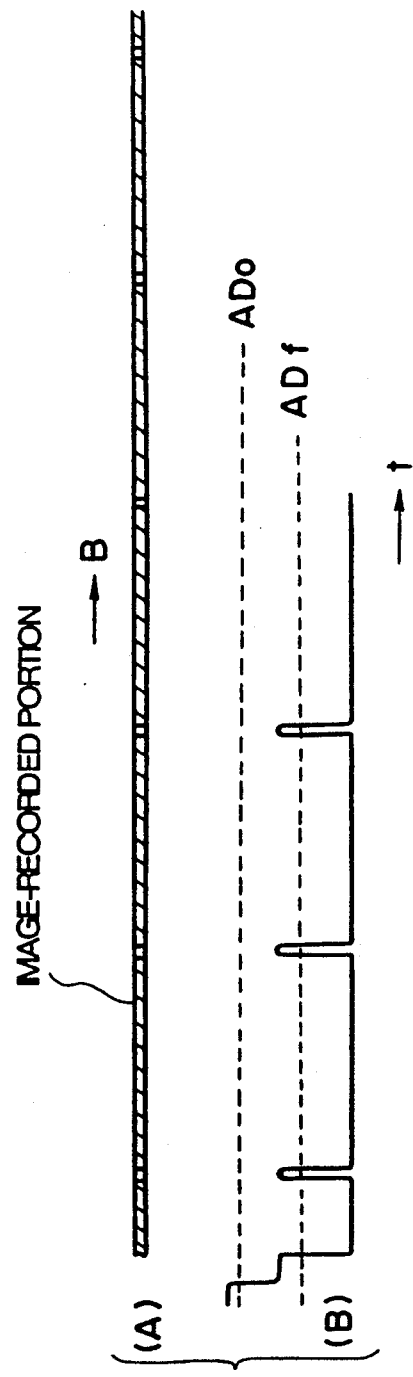
FIG. 22A is a longitudinal cross-sectional view of a strip of negative film, including image portions recorded thereon, in accordance with the third embodiment.
FIG. 22B is a diagram illustrating an output signal of the sensor.

As shown in FIG. 22A, if light from the unillustrated light-emitting elements are applied to the image sensors 46A, 46B, 46C, 46D via the negative F, the amount of light transmitted through the film base portion is greater than that transmitted through the portions where images are recorded. The output signals of the image sensors 46A, 46B, 46C, 46D become such as those shown in FIG. 22B. However, if two negatives F overlap, the portions of the respective negatives F where images are recorded are offset from each other, and the amount of light transmitted through the film base portions of the two negatives becomes smaller than the amount of light transmitted through one negative F. For this reason, whether or not a plurality of negatives F have been supplied can be determined by detecting the positions of portions of a negative exhibiting an amount of light of a predetermined value or more, and by detecting an interval between these positions of the negative.

Figure 16:
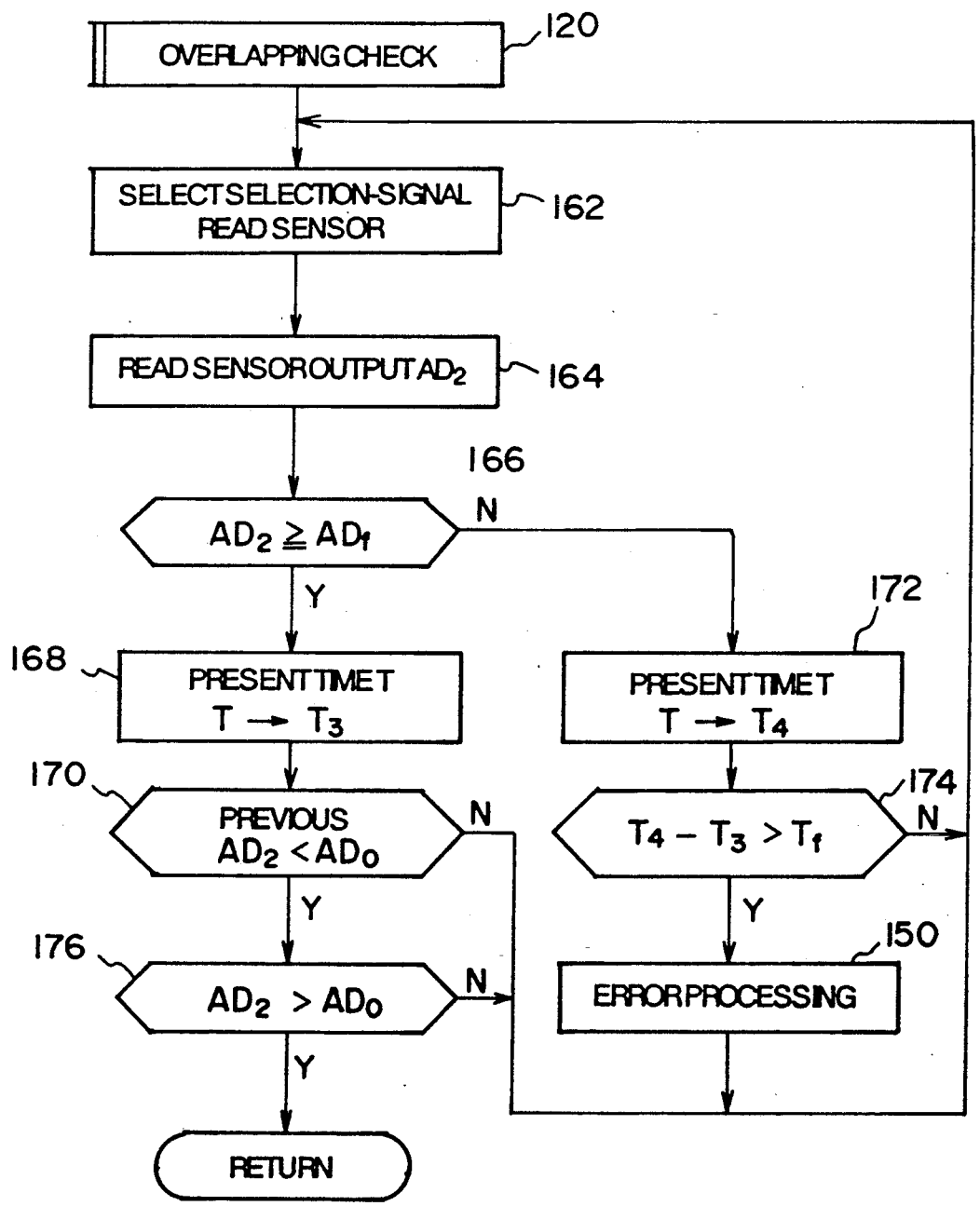
FIG. 16 is a flowchart illustrating control of a film-overlapping check in accordance with the third embodiment.

FIG. 16 shows a subroutine for checking the overlapping of the negatives F by detecting the images on the negative F in accordance with the third embodiment.

In Step 162, one of the plurality of image sensors 46A, 46B, 46C, 46D is selected through keyboard entry or the like. In Step 164, a value $AD_2$ obtained by converting the output of the image sensor 46A, 46B, 46C, or 46D to a digital value is read. In Step 166, a determination is made as to whether or not $AD_2 \geq AD_f$. If $AD_2 < AD_f$, a determination is made that the object detected is a portion of the negative where an image is recorded, and the operation proceeds to Step 172. In Step 172, the present time T is read and stored in an unillustrated register as the time $T_4$, and the operation proceeds to Step 174. In Step 174, a determination is made as to whether or not $T_4 - T_3 > T_f$. If $T_4 - T_3 \leq T_f$, a determination is made that the length of the recorded image in the transport direction is within the range of an image frame. On the other hand, if $T_4 - T_3 > T_f$, since the length of the recorded image in the transport direction exceeds the range of the image frame, so that a determination is made that negatives F overlap, and the operation proceeds to error processing shown in FIG. 23. Upon completion of error processing, the operation returns to Step 162.

Meanwhile, if $AD_2 \geq AD_f$ in Step 166, a determination is made that the object detected is the base portion where no image is recorded, and the operation proceeds to Step 168. In Step 168, the present time is read and stored in the unillustrated register as the time $T_3$. In Step 170, a determination is made as to whether or not $AD_2 < AD_0$ when the previous $AD_2$ value was read. If the previous $AD_2$ value was such that $AD_2 \geq AD_0$, a determination is made that the negative was not present, and the operation returns to Step 162. Meanwhile, if the previous $AD_2$ value was such that $AD_2 < AD_0$, a determination is made that the negative was present, and the operation proceeds to Step 176. In Step 176, a determination is made as to whether or not $AD_2 > AD_0$, and if the present $AD_2$ value is such that $AD_2 < AD_0$, a determination is made that the negative is still present, and the operation returns to Step 162. If the present $AD_2$ value is such that $AD_2 \geq AD_0$, a determination is made that the negative is no longer present, and this routine ends.

In the above-described manner, whether or not a plurality of negatives F have been supplied in an overlapping manner is determined by detecting the amount of light transmitted through adjacent images recorded on the negative F and through the base portion where no image is recorded, as well as the time duration thereof. Accordingly, the negatives are supplied not in an overlapping manner, but one by one. As a result, it is possible to prevent faulty printing due to the overlapping of a plurality of negatives F. In addition, even in cases where the edges of the negatives are damaged or the types of negatives differ, it is possible to determine whether or not a plurality of negatives F have been supplied in an overlapping manner, so that faulty printing due to the overlapping of a plurality of negatives F can be prevented.

It should be noted that, as the aforementioned selector 58, it is preferable to use a multiplexer in which one channel is used by a plurality of circuits through a time sharing system or the like. In addition, although in the foregoing third embodiment a description has been given of a case where four sensors are used, the number of the sensors used is not restricted, and it suffices to measure only measuring points which make it possible to detect characteristic points, or the number of points to be measured may be increased.

In the foregoing third embodiment, a description has been given of a case where whether or not a plurality of negatives F have been supplied in an overlapping manner is determined by detecting a change in the amount of light transmitted through adjacent images recorded on the negative F and through the base portion where no image is recorded. However, an arrangement may be alternatively provided such that information on an image frame which is determined by the configuration of a mask of a camera or the like is detected by a two-dimensional detection sensor or the like, and whether or not a plurality of negatives F have been supplied in an overlapping manner is determined on the basis of the value of a density within a predetermined area.

A description will now be given of a fourth embodiment in which a time duration corresponding to the length of a perforation P through which the light is allowed to pass without being transmitted through the negative F is detected, and a portion which has undergone a change in density between adjacent images recorded on the negative F is detected, so as to determine whether or not a plurality of negatives F have been supplied in an overlapping manner. Since the arrangement of the fourth embodiment is substantially similar to the arrangement of the third embodiment, identical portions will be denoted by the same reference numerals, and a detailed description thereof will be omitted. As the sensors of the fourth embodiment, an unillustrated light-receiving element and a plurality of image sensors are used.

Figure 17:
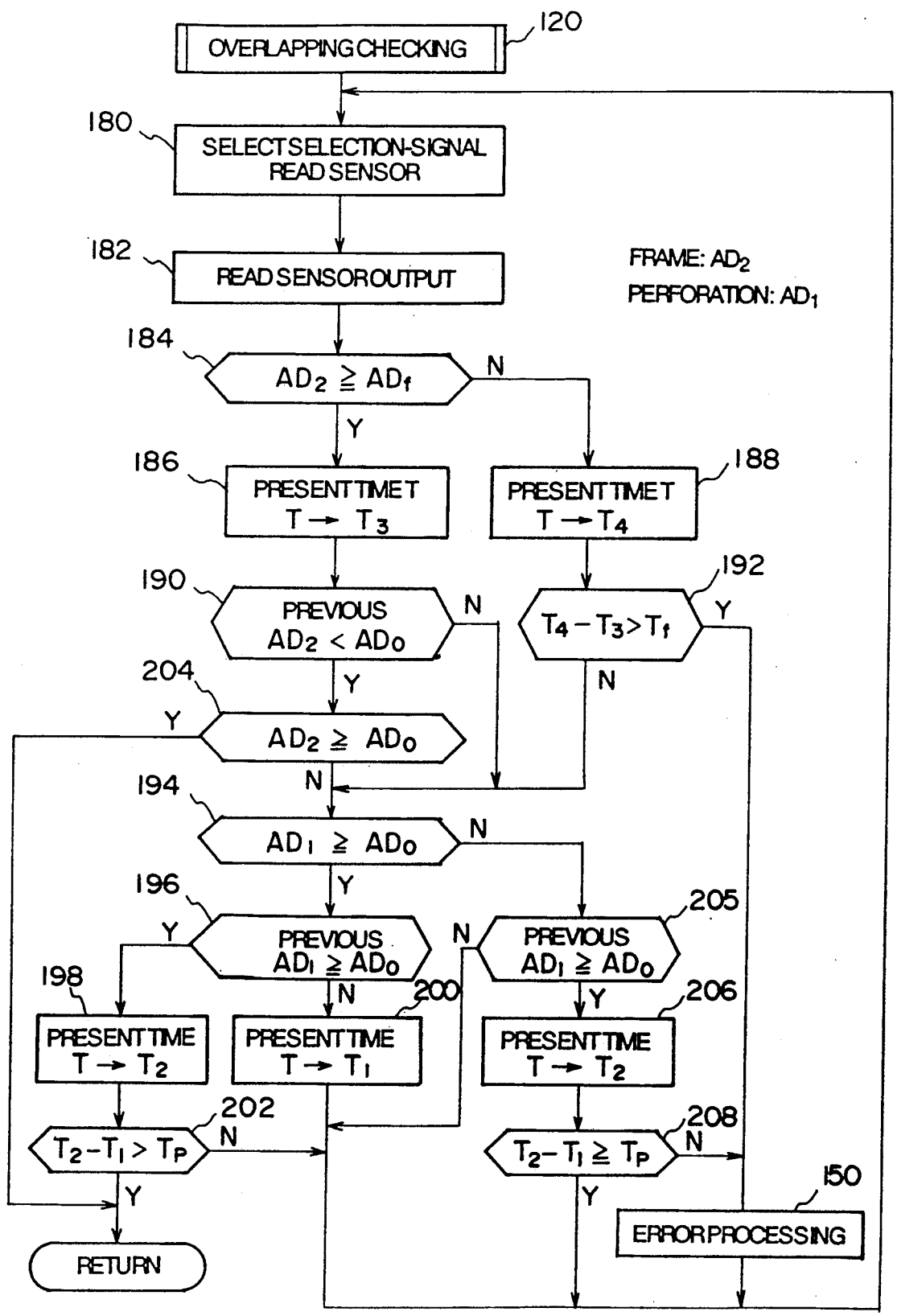
FIG. 17 is a flowchart illustrating control of a film-overlapping check in accordance with the fourth embodiment.

FIG. 17 shows a subroutine for checking the overlapping of the negatives F in accordance with the fourth embodiment.

In Step 180, one of the plurality of image sensors is selected through keyboard entry or the like. In Step 182, a value $AD_1$, obtained by converting the output of the light-receiving element to a digital value, and a value $AD_2$, obtained by converting the output of the image sensor 46 to a digital value, are read. In Step 184, a determination is made as to whether or not $AD_2 \geq AD_f$. If $AD_2 < AD_f$, the present time T is read and stored in the unillustrated register as the time $T_4$, and the operation proceeds to Step 192. In Step 192, a determination is made as to whether or not $T_4 - T_3 > T_f$. If $T_4 - T_3 > T_f$, the operation proceeds to Step 194. On the other hand, if $T_4 - T_3 > T_f$, a determination is made that the negatives F overlap, and the operation proceeds to Step 150 for error processing. Upon completion of error processing, the operation returns to Step 162.

Meanwhile, if $AD_2 \geq AD_f$ in Step 184, the operation proceeds to Step 186. In Step 186, the present time is read and stored in the unillustrated register as the time $T_3$, and the operation proceeds to Step 190. In Step 190, a determination is made as to whether or not $AD_2 < AD_0$ when the previous $AD_2$ was read. If the previous $AD_2 \geq AD_0$, a determination is made that the negative was not present, and the operation proceeds to Step 194. Meanwhile, if the previous $AD_2$ value was such that $AD_2 < AD_0$, a determination is made that the negative was present previously, and the operation proceeds to Step 204. In Step 204, a determination is made as to whether or not the present negative is such that $AD_2 \geq AD_0$, and if the present $AD_2$ value is such that $AD_2 < AD_0$, a determination is made that the negative is still present, and the operation proceeds to Step 194. Meanwhile, if the present $AD_2$ value is such that $AD_2 \geq AD_0$, a determination is made that the negative is no longer present, and this routine ends.

In Step 194, a determination is made as to whether or not $AD_1 \geq AD_0$. If $AD_1 < AD_0$, the operation proceeds to Step 205. In Step 205, a determination is made as to whether or not the previous $AD_1$ value was such that $AD_1 \geq AD_0$. If $AD_1 < AD_0$, the operation returns to Step 180. If the previous $AD_1$ value was such that $AD_1 \geq AD_0$, the operation proceeds to Step 206. In Step 206, the present time T is read and stored as the time $T_2$, and the operation proceeds to Step 208. In Step 208, a determination is made as to whether or not $T_2 - T_1 \geq T_P$. If $T_2 - T_1 \geq T_P$, since the time duration obtained is within a time duration corresponding to the length of the perforation P, a determination is made that the negatives F do not overlap, and the operation returns to Step 180. On the other hand, if $T_2 - T_1 < T_P$, a determination is made that the negatives F overlap, and the operation proceeds to Step 150 for error processing. Upon completion of error processing, the operation returns to Step 180.

Meanwhile, if $AD_2 \geq AD_0$ in Step 194, the operation proceeds to Step 196. In Step 196, a determination is made as to whether or not the previous $AD_1$ value was such that $AD_1 \geq AD_0$. If $AD_1 < AD_0$, the present time T is read and stored as the time $T_1$, and the operation returns to Step 180. If the previous $AD_1$ value was such that $AD_1 \geq AD_0$, the present time T is read and stored as the time $T_2$, and the operation proceeds to Step 202. In Step 202, a determination is made as to whether or not $T_2 - T_1 > T_P$, and if $T_2 - T_1 < T_P$, since the time duration during which the light from the light-emitting element is being directly received is within the range of the length of the perforation P in the transport direction, the operation returns to Step 180. If $T_2 - T_1 > T_P$, since the light from the light-emitting element has been directly received for a duration longer than the length of the perforation P in the transport direction, a determination is made that a predetermined time has elapsed upon completion of one negative, and this routine ends.

In the above-described manner, in the fourth embodiment, whether or not a plurality of negatives F have been supplied in an overlapping manner is determined by detecting the time duration during which the light passes through the perforation P in the negative F, and by detecting the time duration during which the light passes through a portion of the negative F where no image is recorded. In addition, cases where both the perforations P and the image information on the negatives F completely overlap are extremely rare. Accordingly, even if the perforations P in the negatives F completely overlap, a determination can be made by means of the image information, while even items of image information on the negatives F completely overlap, a determination can be made by means of the perforations P. Hence, the plurality of negatives F can be supplied one by one without overlapping, so that faulty printing due to the overlapping of a plurality of negatives F can be prevented.

As for a detector for detecting the above-described perforations P and image information, sensors attached to a conventional photographic printer for determining the printing position may be used. For this reason, the present invention can be readily implemented without newly adding sensors.

As described above, in accordance with the second to fourth embodiments, a determination is made as to whether or not a plurality of negatives have been supplied in an overlapping manner, and in the event that the negatives have been supplied in an overlapping manner, printing is not performed. Hence, there is an advantage in that faulty printing due to overlapping negatives can be prevented.

It should be noted that although in the foregoing embodiments a description has been given of an apparatus for supplying negative film, the present invention is not restricted to the supply of negative film and is also applicable to the supply of positive film, and may also be applied to the supply of other film materials.

What is claimed is:

1. A film supplying apparatus for supplying film to a printer, comprising:
    a holding member for holding at least a vicinity of leading end portions of a plurality of strips of film placed therein in a superposed state with a longitudinal direction of the plurality of strips of film set in a curved configuration; and
    feeding means for consecutively feeding the plurality of strips of film toward said printer as a tension acting in the longitudinal direction is applied to the leading end portion of an innermost one, as viewed in the curved state, of the plurality of strips of film.

2. A film supplying apparatus according to claim 1, wherein said holding member has a substantially U-shaped cross section so as to be provided with a pair of mutually opposing leg portions, and is adapted to clamp transverse opposite edge portions of the plurality of strips of film.

3. A film supplying apparatus according to claim 2, wherein opposing surfaces of said leg portions are provided with at least one of soft fibers, very small projections and recesses, for holding the plurality of strips of film in a mutually spaced-apart state.

4. A film supplying apparatus according to claim 2, wherein said leg portions are arranged such that a distance therebetween becomes gradually smaller in a film supplying direction.

5. A film supplying apparatus according to claim 1, further comprising:
    moving means for moving said holding member between a first position in which feeding by said feeding means toward said printer is allowed and a second position in which the feeding by said feeding means toward said printer is not allowed.

6. A film supplying apparatus according to claim 5, wherein said moving means is constituted by swinging means for swinging the film to move the film between the first position and the second position.

7. A film supplying apparatus according to claim 1, wherein said feeding means is provided with roller means for feeding the film toward said printer as said roller means is brought into contact with a surface of the film and rotates.

8. A film supplying apparatus according to claim 7, further comprising:
    urging means for urging said holding member toward said roller means when the surface of the film is brought into contact with said roller means.

9. A film supplying apparatus according to claim 7, further comprising nip/transport means for nipping and transporting the film fed by said roller means so as to supplying the film to said printer.

10. A film supplying apparatus according to claim 1, further comprising:
    detecting means for detecting an incidence of a case where two or more of the strips of film have been fed by said feeding means in an overlapping state; and
    prohibiting means for prohibiting printing by said printer on the basis of detection by said detecting means.

11. A film supplying apparatus according to claim 1, wherein said film is a negative film.

12. A film supplying apparatus for supplying film to a printer, comprising:
    a holding member for holding at least a vicinity of leading end portions of a plurality of strips of film placed therein in a superposed state with a longitudinal direction of the plurality of strips of film set in a curved configuration;
    feed roller means for feeding the film toward said printer by applying a longitudinally driving force to the film in a pressed state; and
    pressing means for causing said holding member to approach said feed roller means and for pressing the leading end portion of an innermost one, as viewed in a curved state, of the plurality of strips of film against said feed roller means.

13. A film supplying apparatus according to claim 12, wherein said pressing means is arranged to rotate the film about an axis substantially parallel with a traveling direction of the film and to press the film against said feed roller means.

14. A film supplying apparatus according to claim 13, wherein said pressing means is provided with urging means for urging said holding member toward said feed roller means.

15. A film supplying apparatus according to claim 12, further comprising:
    detecting means for detecting an incidence of a case where two or more of the strips of film have been fed by said feed roller means in an overlapping state; and
    prohibiting means for prohibiting printing by said printer on the basis of detection by said detecting means.

16. A film supplying apparatus according to claim 15, further comprising:
    alarm means for issuing an alarm on the basis of the detection by said detecting means.

17. A film supplying apparatus according to claim 12, wherein the film is a negative film.

18. A film supplying apparatus for supplying film to a printer, comprising:
    a holding portion for holding a plurality of strips of film in a superposed state;
    film feeding means for consecutively feeding the plurality of strips of film in a longitudinal direction of the film so as to supply the film to said printer;

detecting means for detecting the film located in a film transport passage between said holding portion and said printer;

determining means for determining on the basis of a detected signal whether or not two or more of the strips of film have been supplied in an overlapping state; and prohibiting means for prohibiting printing by said printer if a determination is made that two or more of the strips of film have been supplied in an overlapping state.

19. A film supplying apparatus according to claim 18, wherein said detecting means detects a length of a perforation of the film in a transport direction thereof, and said determining means determines whether or not two or more of the strips of film have been supplied in an overlapping state, by determining whether or not the length of the perforation in the transport direction is less than a reference value.

20. A film supplying apparatus according to claim 18, wherein said detecting means detects an amount of light transmitted through an area between adjacent ones of frame images recorded on the film, and said determining means determines whether or not two or more of the strips of film have been supplied in an overlapping state, by determining whether or not the amount of light detected is less than a reference value.

21. A film material feeding apparatus comprising:

a holding member for holding at least a vicinity of leading end portions of a plurality of elongated film materials placed therein in a superposed state with a longitudinal direction of the plurality of elongated film materials set in a curved configuration; and feeding means for consecutively feeding the plurality of elongated film materials toward said printer as a tension acting in the longitudinal direction is applied to the leading end portion of an innermost one, as viewed in the curved state, of the plurality of elongated film materials.

22. A film material feeding apparatus according to claim 21, wherein said holding member has a substantially U-shaped cross section so as to be provided with a pair of mutually opposing leg portions, and is adapted to clamp transverse opposite edge portions of the plurality of elongated film materials.

23. A film material feeding apparatus according to claim 22, wherein opposing surfaces of said leg portions are provided with at least one of soft fibers, very small projections and recesses, for holding the plurality of elongated film materials in a mutually spaced-apart state.

24. A film material feeding apparatus according to claim 22, wherein said leg portions are arranged such that a distance therebetween becomes gradually smaller in a film feeding direction.

* * * * *